US012646114B2

(12) United States Patent
Sandow et al.

(10) Patent No.: US 12,646,114 B2
(45) Date of Patent: *Jun. 2, 2026

(54) MANIPULATING TRADING TOOLS

(71) Applicant: TRADING TECHNOLOGIES INTERNATIONAL, INC., Chicago, IL (US)

(72) Inventors: Stefani Sandow, Chicago, IL (US); Richard Lane, Chicago, IL (US); Andrew Shields, Chicago, IL (US); Gregory Ryba, Glen Ellyn, IL (US); Kevin Lim Dudey, Chicago, IL (US); Richard Aleth Lowe, Evanston, IL (US); Stephen P. Decker, Naperville, IL (US)

(73) Assignee: Trading Technologies International, Inc., Chicago, IL (US)

( * ) Notice: Subject to any disclaimer, the term of this patent is extended or adjusted under 35 U.S.C. 154(b) by 32 days.

This patent is subject to a terminal disclaimer.

(21) Appl. No.: 18/311,366

(22) Filed: May 3, 2023

(65) Prior Publication Data

US 2023/0274357 A1     Aug. 31, 2023

Related U.S. Application Data

(63) Continuation of application No. 17/143,129, filed on Jan. 6, 2021, now Pat. No. 11,688,006, which is a continuation of application No. 14/975,413, filed on Dec. 18, 2015, now Pat. No. 10,915,952.

(51) Int. Cl.
*G06Q 40/04*          (2012.01)

(52) U.S. Cl.
CPC .................................... *G06Q 40/04* (2013.01)

(58) Field of Classification Search
CPC ...................................................... G06Q 40/04
USPC ........................................................... 705/37
See application file for complete search history.

(56) References Cited

U.S. PATENT DOCUMENTS

| | | | |
|---|---|---|---|
| 5,339,392 A | 8/1994 | Risberg et al. | |
| 5,914,715 A | 6/1999 | Sasaki | |
| 6,031,530 A | 2/2000 | Trueblood | |
| 6,772,132 B1 | 8/2004 | Kemp, II et al. | |
| 6,874,126 B1 | 3/2005 | Lapidous | |
| 7,068,288 B1 | 6/2006 | Good et al. | |
| 7,082,398 B1 | 7/2006 | Apple et al. | |

(Continued)

*Primary Examiner* — Ambreen A. Alladin
(74) *Attorney, Agent, or Firm* — MCDONNELL BOEHNEN HULBERT & BERGHOFF LLP

(57) ABSTRACT

Trading tools may be manipulated by allowing assembly, disassembly, and configuration of different trading tools. The assembly of different trading tools may generate combined trading tools. The combined trading tools may enable interoperability between the trading tools therein. Customization of the combined trading tools may be enabled by enabling a user to rearrange predefined areas displayed within the trading tools within the combined trading tools. The customization of the combined trading tools may enable customization of different functionality within the combined trading tools. The trading tools within a combined trading tool may include a tab tool for enabling multiple instances of another trading tool to which the tab tool is attached. Each instance of a trading tool may be associated with a respective tab for enabling a user to toggle between the multiple instances of the trading tool.

20 Claims, 18 Drawing Sheets

(56) References Cited

U.S. PATENT DOCUMENTS

| 7,127,424 B2 | 10/2006 | Kemp, II et al. |
|---|---|---|
| 7,146,615 B1 | 12/2006 | Hervet et al. |
| 7,158,951 B2 | 1/2007 | Stark |
| 7,185,290 B2 | 2/2007 | Cadiz et al. |
| 7,228,289 B2 | 6/2007 | Brumfield et al. |
| 7,231,630 B2 | 6/2007 | Acott et al. |
| 7,389,268 B1 | 6/2008 | Kemp, II et al. |
| 7,627,518 B1 | 12/2009 | West |
| 7,765,143 B1 | 7/2010 | West |
| 7,805,361 B2 | 9/2010 | West |
| 7,953,657 B2 | 5/2011 | West |
| 8,069,111 B2 | 11/2011 | West |
| 8,521,641 B2 | 8/2013 | West |
| 9,947,047 B2 | 4/2018 | West |
| 2001/0049651 A1 | 12/2001 | Selleck |
| 2003/0058277 A1 | 3/2003 | Bowman-Amuah |
| 2003/0142238 A1 | 7/2003 | Wasack et al. |
| 2003/0158798 A1 | 8/2003 | Green |
| 2004/0117292 A1 | 6/2004 | Brumfield et al. |
| 2005/0088452 A1 | 4/2005 | Hanggie et al. |
| 2010/0037175 A1 | 2/2010 | West |
| 2010/0257090 A1 | 10/2010 | West |
| 2011/0202449 A1 | 8/2011 | West |
| 2012/0036062 A1 | 2/2012 | West |
| 2012/0265664 A1* | 10/2012 | Triplett .................. G06Q 40/04 705/37 |
| 2014/0095369 A1 | 4/2014 | West |
| 2014/0188682 A1* | 7/2014 | Singer ................... G06Q 40/04 705/37 |
| 2017/0178232 A1 | 6/2017 | Sandow et al. |
| 2018/0182034 A1 | 6/2018 | West |

* cited by examiner

100

110

TRADING DEVICE

120

GATEWAY

130

EXCHANGE

MANIPULATING TRADING TOOLS

The present application is a continuation of U.S. patent application Ser. No. 17/143,129, filed Jan. 6, 2021, which is a continuation of U.S. patent application Ser. No. 14/975, 413 filed Dec. 18, 2015, now U.S. Pat. No. 10,915,952, the entire contents of which are herewith incorporated by reference into the present application for all purposes.

BACKGROUND

An electronic trading system generally includes a trading device in communication with an electronic exchange. The trading device receives information about a market, such as prices and quantities, from the electronic exchange. The electronic exchange receives messages, such as messages related to orders, from the trading device. The electronic exchange attempts to match quantity of an order with quantity of one or more contra-side orders.

The trading device can allow users to display multiple windows to view information about the market from one or more electronic exchanges. Users may have these windows displayed, but may be using a portion of the information provided by these windows or may not even be using the information at all for extended periods of time. This may cause the trading device to inefficiently process information being provided to users at trading devices.

BRIEF DESCRIPTION OF THE FIGURES

Certain embodiments are disclosed with reference to the following drawings.

Figure 1:
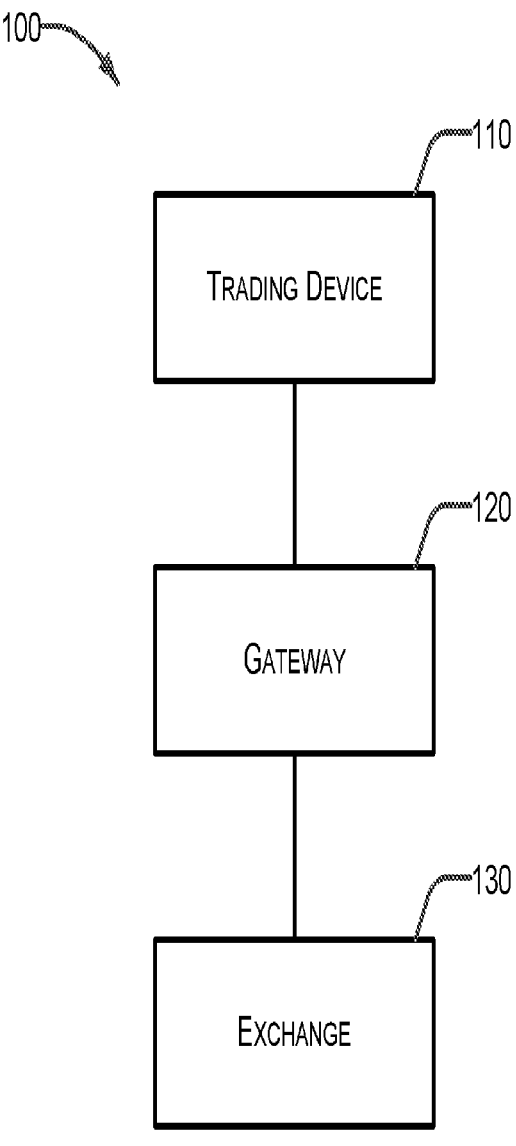
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

Systems, methods, and apparatus are described herein for manipulating trading tools. Trading tools may be manipulated by allowing assembly and disassembly of the different trading tools. The assembly of different trading tools may generate combined trading tools. The combined trading tools may enable interoperability between the trading tools that make up the combined trading tools.

A trading tool manipulation mode may be entered for enabling assembly and disassembly of combined trading tools. A user may enter the trading tool manipulation mode to assemble a combined trading tool that comprises multiple independent trading tools. The user may enter an active trading tool mode for receiving market data at the combined trading tool and allowing the interoperability between the individual trading tools that make up the combined trading tool. The trading tool manipulation mode may be entered for enabling disassembly of the combined trading tools.

Customization of the combined trading tool may be enabled by enabling a user to rearrange predefined areas displayed within the trading tools within the combined trading tool. The predefined areas may be rearranged by adding, removing, and/or rearranging buttons within the predefined areas. The buttons may correspond to different functions of the trading tool within which the predefined areas are displayed.

The trading tools may include a tab tool for enabling multiple instances of another trading tool to which the tab tool is attached. Each instance of a trading tool may be associated with a respective tab for enabling a user to toggle between the multiple instances of the trading tool.

The embodiments described herein may be implemented by a computing device. For example, the computing device may comprise a tool manipulation module that may be used to implement the embodiments described herein. For example, the tool manipulation module may be a hardware or software module. The tool manipulation module may be a software module that may be executed by a processor from memory at the computing device.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

I. BRIEF DESCRIPTION OF CERTAIN EMBODIMENTS

Systems, methods, and apparatus are described herein for manipulating trading tools. As described herein, a trading tool manipulation mode may be entered for enabling assembly of trading tools in a workspace. A first trading tool may be displayed in the workspace upon receiving an indication of a first user selection of the first trading tool. A second trading tool may be displayed in the workspace upon receiving an indication of a second user selection of the second trading tool. The first trading tool and the second trading tool may be attached to assemble a combined trading tool.

The combined trading tool may enable interoperability between the first trading tool and the second trading tool. The first trading tool and the second trading tool may be attached on opposite sides of the respective trading tools. Respective attachment indicators may be displayed on the first trading tool and the second trading tool that identify the relative locations on the first trading tool and the second trading tool at which the first trading tool and the second trading tool are capable of being attached. The combined trading tool may be stored for subsequent access by the user.

Customization of the combined trading tool may be enabled by enabling a user to rearrange predefined areas displayed within the first trading tool and/or the second trading tool. The predefined areas may be rearranged by adding, removing, and/or rearranging buttons within the predefined areas. The buttons may correspond to different functions of the first trading tool and/or the second trading tool within which the predefined areas are displayed.

An active trading tool mode may be entered for receiving market data at the combined trading tool. The active trading tool mode may enable the interoperability of the trading tools within the combined trading tool upon receipt of market data and/or inputs/outputs at the other trading tools.

The trading tool manipulation mode may be entered for enabling disassembly of the combined trading tool in the workspace. The first trading tool may be detached from the second trading tool or the second trading tool may be detached from the first trading tool. The first trading tool may be detached from the second trading tool based on a disassembly indicator that identifies the first trading tool. The disassembly indicator is generated upon entry of a disassembly mode within the trading tool manipulation mode.

During the trading tool manipulation mode, a third trading tool may be displayed in the workspace upon receiving an indication of a third user selection of the third trading tool. The third trading tool may be attached to the first trading tool and/or the second trading tool within the combined trading tool. The combined trading tool may enable interoperability between the first trading tool, the second trading tool, and the third trading tool. During the trading tool manipulation mode, the third trading tool may be detached from the first trading tool and/or the second trading tool.

The second trading tool may be a tab tool for enabling multiple instances of the first trading tool. Each instance of the first trading tool may be associated with a respective tab for enabling a user to toggle between the multiple instances of the first trading tool.

The embodiments described herein may be implemented by a computing device. For example, the computing device may comprise a tool manipulation module that may be used to implement the embodiments described herein.

II. EXAMPLE ELECTRONIC TRADING SYSTEM

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication with" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data may include data about a market for a tradeable object. For example, market data may include the inside market, market depth, last traded price ("LTP"), a last traded quantity ("LTQ"), or a combination thereof. The inside market refers to the highest available bid price (best bid) and the lowest available ask price (best ask or best offer) in the market for the tradeable object at a particular point in time (since the inside market may vary over time). Market depth refers to quantities available at price levels including the inside market and away from the inside market. Market depth may have "gaps" due to prices with no quantity based on orders in the market.

The price levels associated with the inside market and market depth can be provided as value levels which can encompass prices as well as derived and/or calculated representations of value. For example, value levels may be displayed as net change from an opening price. As another example, value levels may be provided as a value calculated from prices in two other markets. In another example, value levels may include consolidated price levels.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange, a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object; a command to initiate managing orders according to a defined trading strategy; a command to change, modify, or cancel an order; an instruction to an electronic exchange relating to an order; or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Illinois ("Trading Technologies"). As another example, the trading device 110 may be a server running a trading application providing automated trading tools such as ADL®, AUTOSPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, a group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may be implemented utilizing computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or unrequested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a cellular network, a peer-to-peer network, a T1 line, a T3 line, an integrated services digital network ("ISDN") line, a point-of-presence, the Internet, a shared memory system and/or a proprietary network such as TTNET™ provided by Trading Technologies, for example.

The gateway 120 may include one or more electronic computing platforms. For example, the gateway 120 may be implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a wireless network, a virtual private network, a cellular network, a peer-to-peer network, a T1 line, a T3 line, an ISDN line, a point-of-presence, the Internet, a shared memory system, and/or a proprietary network such as TTNET™ provided by Trading Technologies, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. Once an order to buy or sell a tradeable object is received and confirmed by the exchange, the order is considered to be a working order until it is filled or cancelled. If only a portion of the quantity of the order is matched, then the partially filled order remains a working order. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. EXPANDED EXAMPLE ELECTRONIC TRADING SYSTEM

Figure 2:
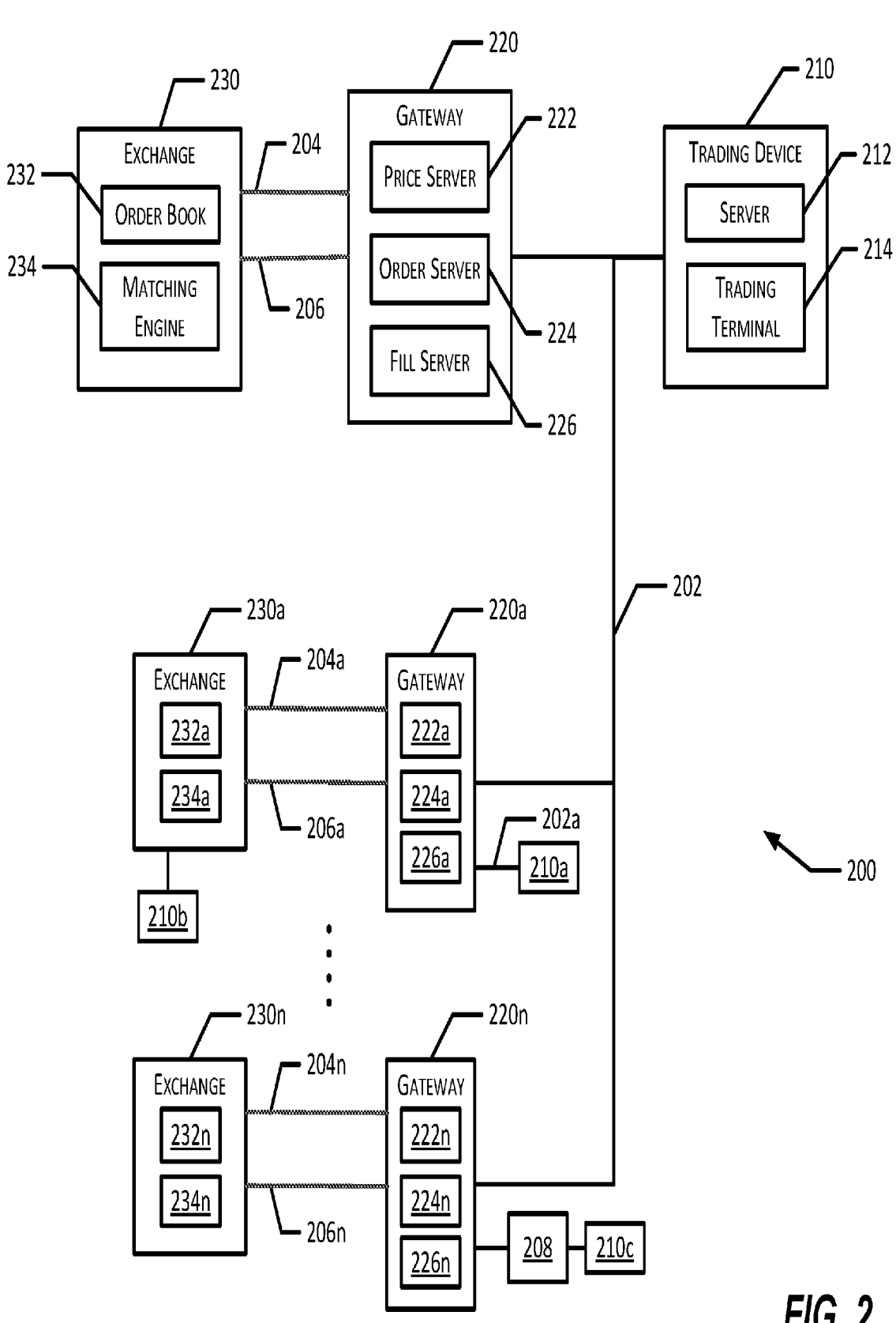
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210 may utilize one or more communication networks to communicate with a gateway 220 and exchange 230. For example, the trading device 210 utilizes network 202 to communicate with the gateway 220, and the gateway 220, in turn, utilizes the networks 204 and 206 to communicate with the exchange 230. As used herein, a network facilitates or enables communication between computing devices such as the trading device 210, the gateway 220, and the exchange 230.

The following discussion generally focuses on the trading device 210, gateway 220, and the exchange 230. However, the trading device 210 may also be connected to and communicate with "n" additional gateways (individually identified as gateways 220a-220n, which may be similar to gateway 220) and "n" additional exchanges (individually identified as exchanges 230a-230n, which may be similar to exchange 230) by way of the network 202 (or other similar networks). Additional networks (individually identified as networks 204a-204n and 206a-206n, which may be similar to networks 204 and 206, respectively) may be utilized for communications between the additional gateways and exchanges. The communication between the trading device 210 and each of the additional exchanges 230a-230n need not be the same as the communication between the trading device 210 and exchange 230. Generally, each exchange has its own preferred techniques and/or formats for communicating with a trading device, a gateway, the user, or another exchange. It should be understood that there is not necessarily a one-to-one mapping between gateways 220a-220n and exchanges 230a-230n. For example, a particular gateway may be in communication with more than one exchange. As another example, more than one gateway may be in communication with the same exchange. Such an arrangement may, for example, allow one or more trading devices 210 to trade at more than one exchange (and/or provide redundant connections to multiple exchanges).

Additional trading devices 210a-210c, which may be similar to trading device 210, may be connected to one or more of the gateways 220a-220n and exchanges 230a-230n. For example, the trading device 210a may communicate with the exchange 230a via the gateway 220a and the networks 202a, 204a and 206a. In another example, the trading device 210b may be in direct communication with exchange 230a. In another example, trading device 210c may be in communication with the gateway 220n via an intermediate device 208 such as a proxy, remote host, or WAN router.

The trading device 210, which may be similar to the trading device 110 in FIG. 1, includes a server 212 in communication with a trading terminal 214. The server 212 may be located geographically closer to the gateway 220 than the trading terminal 214 in order to reduce latency. In operation, the trading terminal 214 may provide a trading screen to a user and communicate commands to the server 212 for further processing. For example, a trading algorithm may be deployed to the server 212 for execution based on market data. The server 212 may execute the trading algorithm without further input from the user. In another example, the server 212 may include a trading application providing automated trading tools and communicate back to the trading terminal 214. The trading device 210 may include additional, different, or fewer components.

In operation, the network 202 may be a multicast network configured to allow the trading device 210 to communicate with the gateway 220. Data on the network 202 may be logically separated by subject such as, for example, by prices, orders, or fills. As a result, the server 212 and trading terminal 214 can subscribe to and receive data such as, for example, data relating to prices, orders, or fills, depending on their individual needs.

The gateway 220, which may be similar to the gateway 120 of FIG. 1, may include a price server 222, order server 224, and fill server 226. The gateway 220 may include additional, different, or fewer components. The price server 222 may process price data. Price data includes data related to a market for one or more tradeable objects. The order server 224 processes order data. Order data is data related to a user's trade orders. For example, order data may include order messages, confirmation messages, or other types of messages. The fill server collects and provides fill data. Fill data includes data relating to one or more fills of trade orders. For example, the fill server 226 may provide a record of trade orders, which have been routed through the order server 224, that have and have not been filled. The servers 222, 224, and 226 may run on the same machine or separate machines. There may be more than one instance of the price server 222, the order server 224, and/or the fill server 226 for gateway 220. In certain embodiments, the additional gateways 220a-220n may each includes instances of the servers 222, 224, and 226 (individually identified as servers 222a-222n, 224a-224n, and 226a-226n).

The gateway 220 may communicate with the exchange 230 using one or more communication networks. For example, as shown in FIG. 2, there may be two communication networks connecting the gateway 220 and the exchange 230. The network 204 may be used to communicate market data to the price server 222. In some instances, the exchange 230 may include this data in a data feed that is published to subscribing devices. The network 206 may be used to communicate order data to the order server 224 and the fill server 226. The network 206 may also be used to communicate order data from the order server 224 to the exchange 230.

The exchange 230, which may be similar to the exchange 130 of FIG. 1, includes an order book 232 and a matching engine 234. The exchange 230 may include additional, different, or fewer components. The order book 232 is a database that includes data relating to unmatched trade orders that have been submitted to the exchange 230. For example, the order book 232 may include data relating to a market for a tradeable object, such as the inside market, market depth at various price levels, the last traded price, and the last traded quantity. The matching engine 234 may match contra-side bids and offers pending in the order book 232. For example, the matching engine 234 may execute one or more matching algorithms that match contra-side bids and offers. A sell order is contra-side to a buy order. Similarly, a buy order is contra-side to a sell order. A matching algorithm may match contra-side bids and offers at the same price, for example. In certain embodiments, the additional exchanges 230a-230n may each include order books and matching engines (individually identified as the order book 232a-232n and the matching engine 234a-234n, which may be similar to the order book 232 and the matching engine 234, respectively). Different exchanges may use different data structures and algorithms for tracking data related to orders and matching orders.

In operation, the exchange 230 may provide price data from the order book 232 to the price server 222 and order data and/or fill data from the matching engine 234 to the order server 224 and/or the fill server 226. Servers 222, 224, 226 may process and communicate this data to the trading device 210. The trading device 210, for example, using a trading application, may process this data. For example, the data may be displayed to a user. In another example, the data may be utilized in a trading algorithm to determine whether a trade order should be submitted to the exchange 230. The trading device 210 may prepare and send an order message to the exchange 230.

In certain embodiments, the gateway 220 is part of the trading device 210. For example, the components of the gateway 220 may be part of the same computing platform as the trading device 210. As another example, the functionality of the gateway 220 may be performed by components of the trading device 210. In certain embodiments, the gateway 220 is not present. Such an arrangement may occur when the trading device 210 does not need to utilize the gateway 220 to communicate with the exchange 230, such as if the trading device 210 has been adapted to communicate directly with the exchange 230.

IV. EXAMPLE COMPUTING DEVICE

Figure 3:
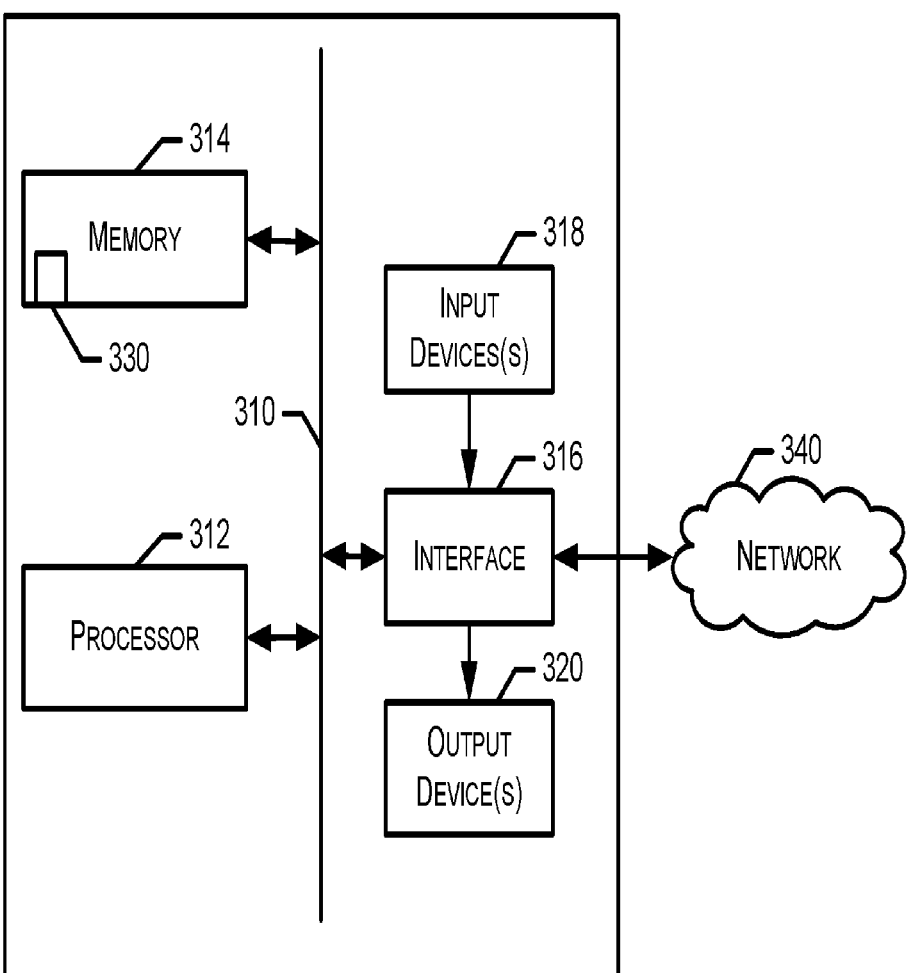
FIG. 3 illustrates a block diagram of an example computing device which may be used to implement the disclosed embodiments.

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

V. MANIPULATION OF TRADING TOOLS

FIGS. 4A-4H illustrate an example user interface 400 that may be displayed on a computing device to allow a user to manipulate trading tools that may be used to submit trade orders and/or display information related to tradeable objects at electronic exchanges. As different users may use different trading tools or groups of trading tools differently to fit the user's trading style, the user interface 400 may assist the user in manipulating trading tools for providing the user with an interface that fits the user's particular trading style. The user interface 400 may allow the user to generate combined trading tools that may occupy less space within the user interface 400 and/or reduce processing power that may be used to operate the trading tools independently.

Figure 4A:
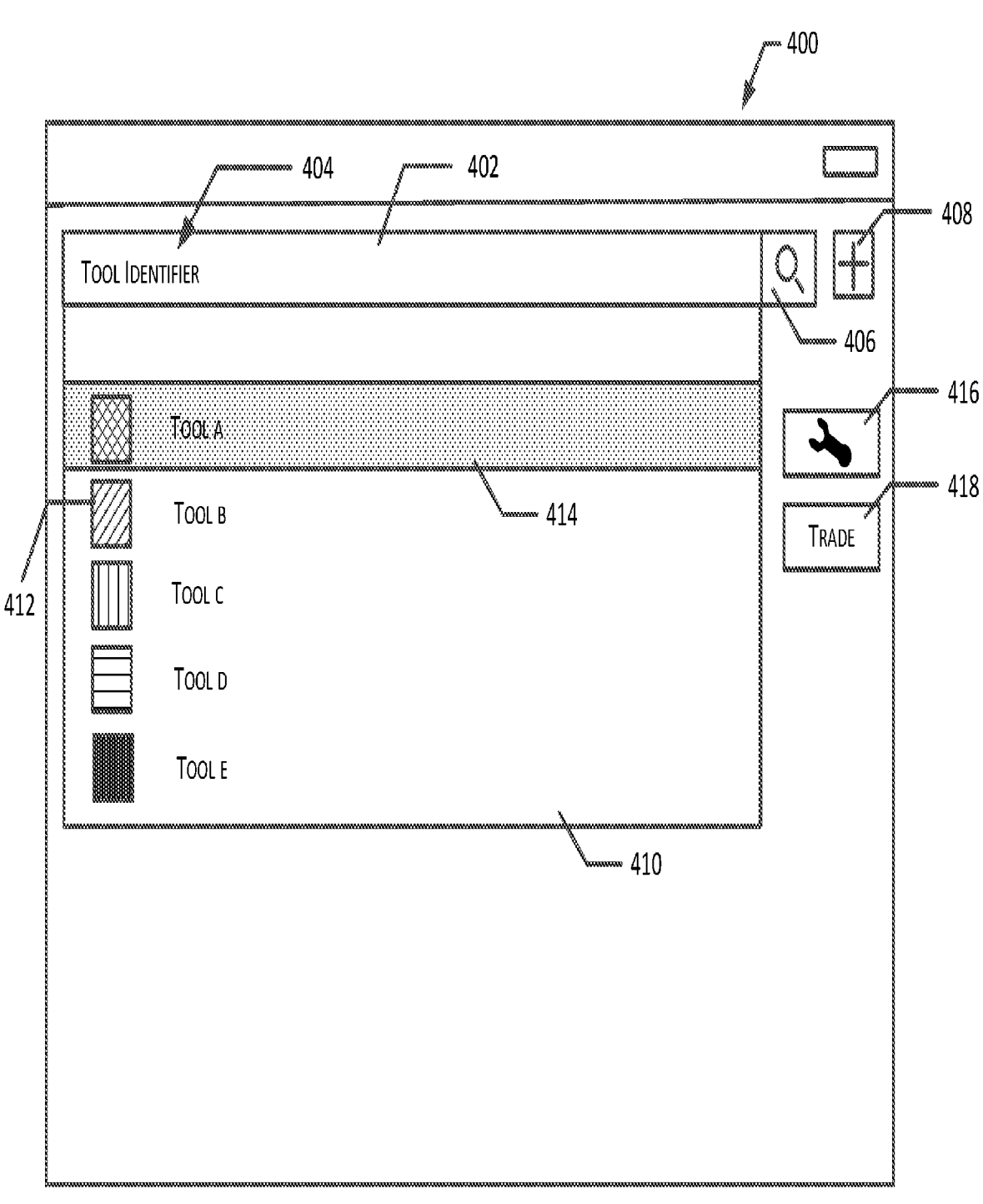
FIGS. 4A-4H illustrate an example user interface that may be displayed on a computing device to allow a user to manipulate trading tools.

As shown in FIG. 4A, the user interface 400 may enter a trading tool manipulation mode upon the selection of button 416 to allow a user to manipulate different trading tools or groups of trading tools. The user interface 400 may enter an active trading tool mode upon the selection of button 418 to allow a user to execute the trading tool or combination of trading tools to submit trade orders and/or display information related to tradeable objects at electronic exchanges. The active trading tool mode or the trading tool manipulation mode may be the default mode when the user interface 400 is first or initially displayed to the user.

The user may select the button 408 to add one or more predefined trading tools to the user interface 400. The button 408 may display a tools field that includes predefined tools for user selection. The predefined tools may be executed and displayed in the user interface 400 (e.g., in response to a user selection of a key or combination of keys). The user interface 400 may display a search field 402 that may allow a user to search for predefined tools. The user may enter a tool identifier 404 into the search field 402 to search for a tool. The tool identifier 404 may be a name or other identifier of a tool, for example. The computing device may receive the character string in the tool identifier 404 and retrieve the tools that include the character string in the tool identifier 404. For example, the computing device may query a product dataset to retrieve the tools that have a tool name that includes the characters in the tool identifier 404. The product dataset may be stored locally at the computing device or at a remote computing device. The tool identifiers may be associated with the tradeable objects in the product dataset that may be displayed in the tools and/or for which market data may be displayed in the tools.

Upon identification of a tool identifier 404, or a portion of the tool identifier 404, in the search field 402, the user interface 400 may display a tools field 410 that may be selected by a user. The tools field 410 may be generated upon user selection of the search icon 406 or in real-time as the user is entering characters into the search field 402. The tools field 410, or a similar tools field, may be generated upon selection of the button 408. Each tool in the tools field 410 may include a respective icon 412 that identifies the type of trading tool. The tools in the tools field 410 may be differentiated by different names, colors, or other differentiators. A selected tool may be identified by the indicator 414.

The user interface 400 may display a number of different tools. The tools may include trading tools. The trading tools may be used to display identified tradeable objects and/or market data related to the tradeable objects. Different trading tools may be used to display different market data for selected tradeable objects. The trading tools may be applications (e.g., trading applications) embedded within the user interface 400 or display windows embedded within the user interface 400. For example, the trading tools may be a trading application such as ADL®, AUTOSPREADER®, and/or AUTOTRADER™, provided by Trading Technologies.

The trading tools in the tools field 410 may include, for example, a market grid tool, a time and sales tool, a trader tool, an order window tool, and/or a chart tool. The market grid tool may display real-time market data for financial products. The time and sales tool may identify records of sales information for financial products. For example, the records in the time and sales tool may identify a time and a sale of a selected tradeable object for a defined period of time. The trader tool may display real-time market data for selected tradeable objects and may allow a user to submit trade orders to an exchange. For example, the trader tool may be a trading tool such as MD TRADER® provided by Trading Technologies. The chart tool may display a graphical representation or chart identifying the market data for a selected tradeable object over a defined period of time. The chart tool may identify trends in the market data for the identified tradeable objects over the defined period of time. The order window tool may allow a user to enter one or more order parameters for a trade order. The order window may display market data related to one or more tradeable object, such as an order price and/or an order quantity, such that the user may submit proper order parameters for the trade order. Each of the tools in the tools field 410 may have different parameters of market data that may be retrieved and displayed to a user upon selection.

The tools in the tools field 410 may include a tabs tool that may display tabs that correspond to different applications and/or instances of an application to allow for selection and display of different applications and/or instances of applications. For example, the tabs tool may allow for different instances of trading tools. Each instance of a trading tool may have a respective tab being displayed for user selection to allow a user to toggle between the multiple instances of the trading tool. The tabs tool is further described elsewhere herein.

Tradeable objects may be entered in the search field 402 and may cause different tools to be displayed in the tools field 410. The selection of a tradeable object may generate the name of one or more tools in the tool field 410 that may be used to display information for the tradeable object. For example, the tools may display market data for the tradeable object. The tools in the tool field 410 may include the tools generated upon the selection of the tradeable object. The tradeable object may be associated with one or more tools in the product dataset.

Upon execution of one of the predefined tools, the computing device on which the user interface 400 is being displayed, or another remote computing device with which the computing device on which the user interface 400 is being displayed is interacting, may send a request to an identified exchange and/or gateway for the market data for a tradeable object. The trading tools may send requests that include respective parameters for retrieving and/or displaying different market data. One or more of the tools may allow a user to perform actions on the retrieved market data, such as submitting trade orders to an exchange.

Figure 4B:
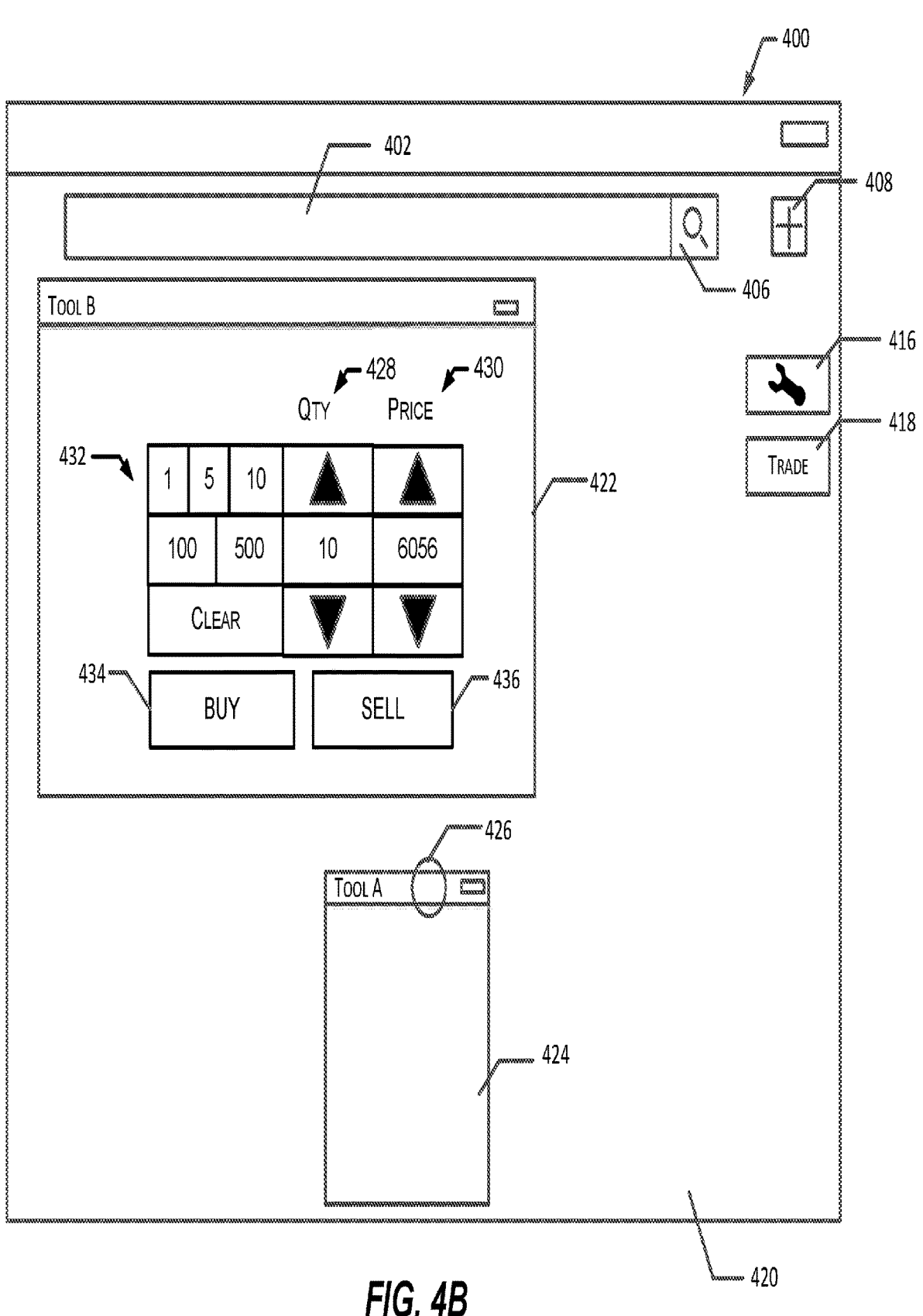

As shown in FIG. 4B, multiple trading tools, such as trading tool 422 and trading tool 424, may be executed and displayed in the user interface 400. The trading tools 422, 424 may be displayed in a workspace 420 during the manipulation mode to allow for manipulation of the trading tools 422, 424. The trading tool 422 may be an order window tool, for example, that may be used to submit order parameters for a trade order. The order window tool may allow the user to enter an order quantity 428 and/or an order price 430 for a trade order. The order type may be a buy order that may be indicated by the user selecting the buy button 434 or a sell order that may be indicated by the user selecting the sell button 436. The order window tool may allow the user to enter predefined order quantities by selecting the predefined quantity buttons 432.

The trading tool 424 may be a market grid tool that may display real-time market data for tradeable objects. The trading tool 422 and the trading tool 424 may interact with the same market data, such that the interaction with the market data on one trading tool may be identified by the other trading tool. For example, the market grid tool may display real-time market data that may reflect changes in the market data based on trade orders submitted from the order window tool. Though the order window tool and the market grid tool are provided as examples of trading tool 422 and trading tool 424, respectively, other trading tools may be executed and/or manipulated as described herein.

The user may select a trading tool, such as the trading tool 424, to be manipulated. The user may select the trading tool by pressing and holding a button on the mouse, touching the trading tool 424 on a touch screen, and/or performing another form of user selection. The user interface 400 may include a user selection identifier 426 that may identify a location of a user selection. The user selection identifier 426 may flag, highlight or otherwise identify a tool or tools that have been selected and/or a location of the user selection on the tool or tools.

A user may manipulate the trading tools to assemble a combined trading tool from independent trading tools. For example, the user may combine the trading tool 422 and the trading tool 424 by dragging the trading tool 424 and attaching the trading tool to the trading tool 422. The user may drag the trading tool 424 to a location on the trading tool 422 to which the user would like the trading tool 424 to be attached.

Figure 4C:
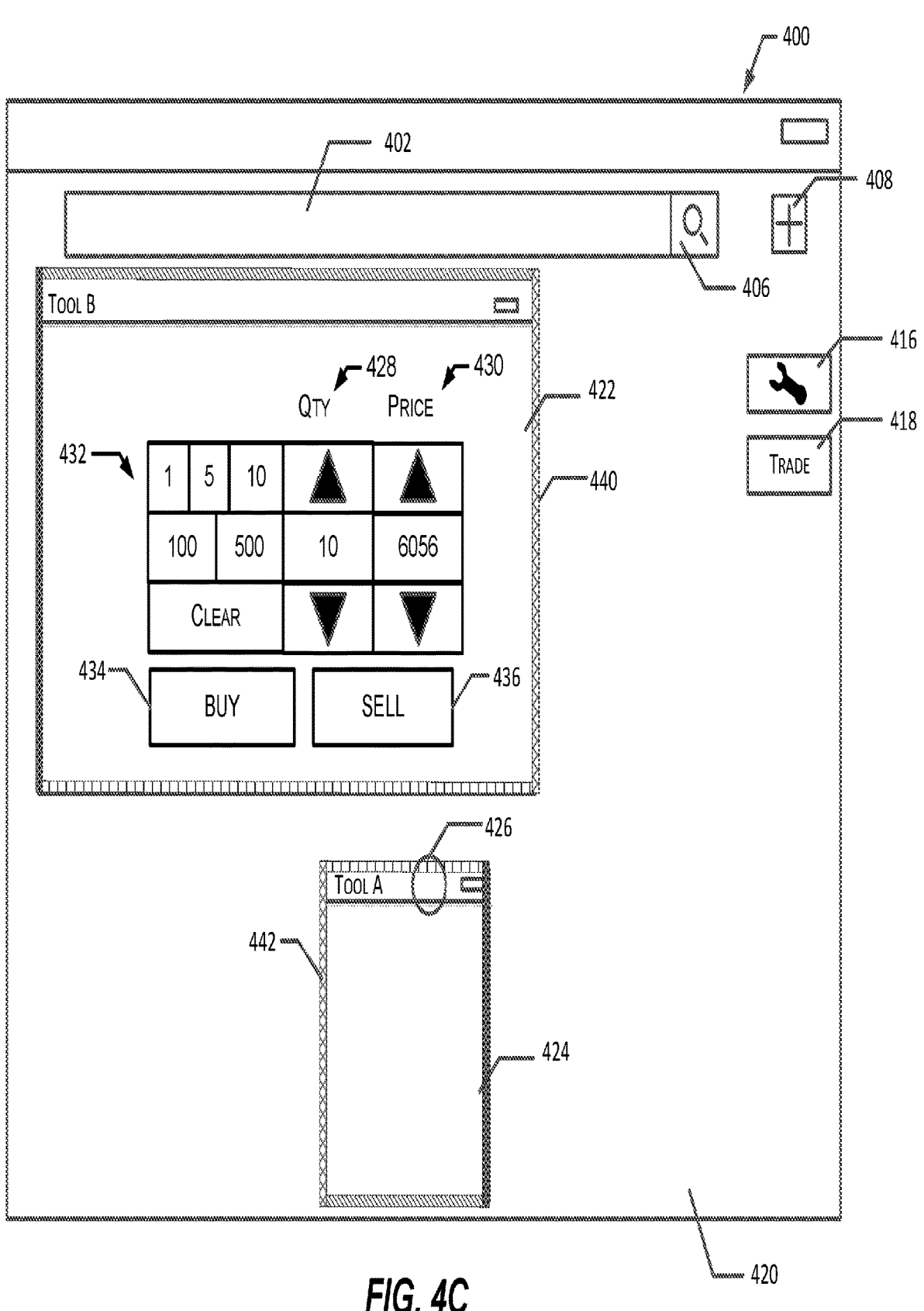

As shown in FIG. 4C, the user interface 400 may identify locations on the trading tools 422, 424 that may be attached. The locations on the trading tool 422 and the trading tool 424 that may be attached may be identified by attachment indicators 440 and attachment indicators 442, respectively. For example, the attachment indicators 440 and 442 may identify different sides of the trading tools 422 and 424, respectively, that may be attached to one another. The attachment indicators 440, 442 may be identified by the computing device upon selection of one of the trading tools 422, 424. The attachment indicators 440 on the trading tool 422 may include different patterns, colors, symbols, and/or other differentiators that correspond to attachment indicators 442 on the trading tool 424. The trading tools 422, 424 may be attached at the locations having the corresponding attachment indicators 440, 442. For example, the trading tools 422, 424 may be attached on opposite sides of each tool, which may be reflected by the attachment indicators 440, 442. The computing device may identify when acceptable locations on the trading tools 422, 424 come within a predefined distance of one another (e.g., touch one another) to be attached.

Figure 4D:
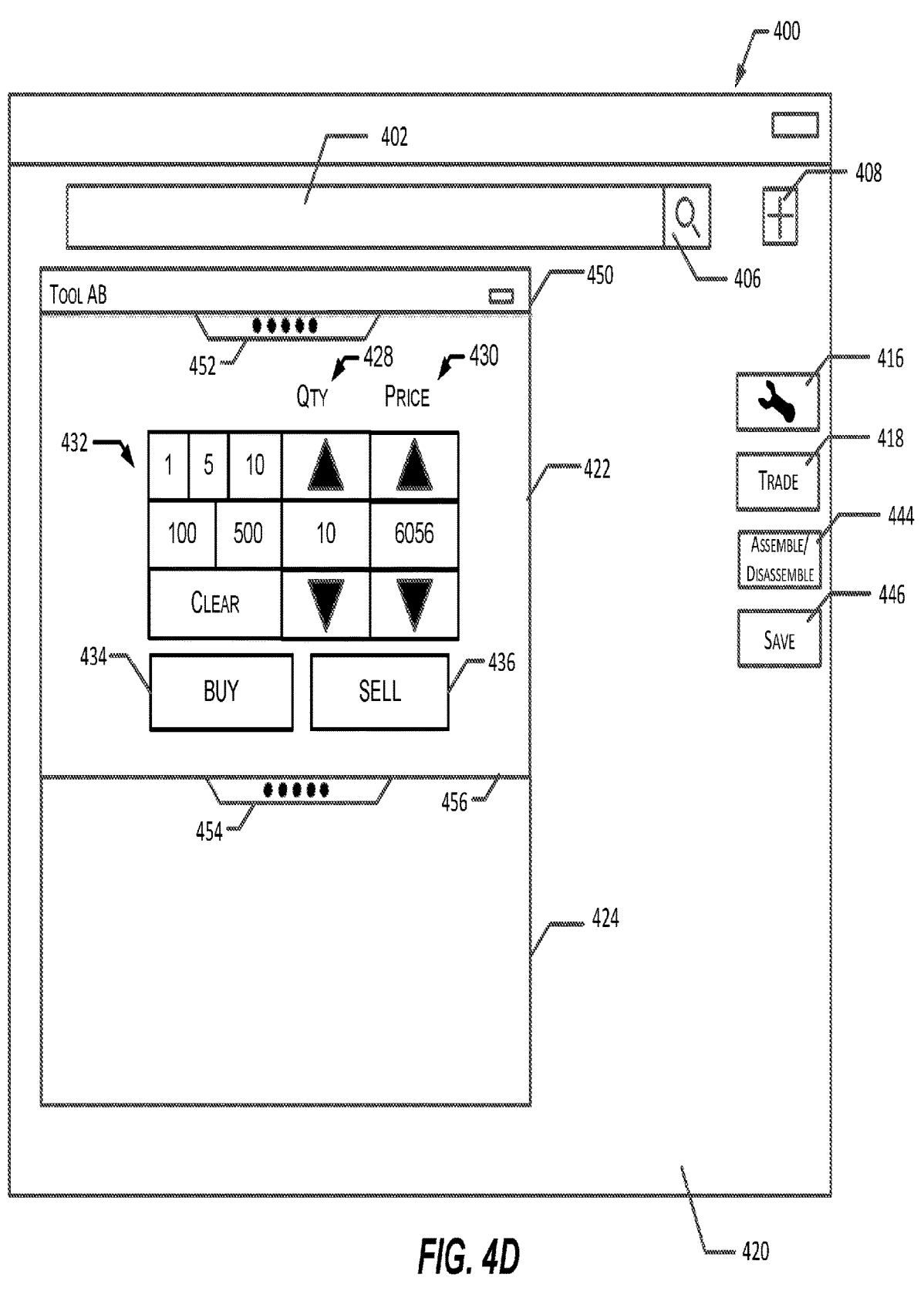

FIG. 4D shows an example of a combined trading tool 450. The combined trading tool 450 may include the trading tool 422 and the trading tool 424. The trading tools 422, 424 that make up the combined trading tool 450 may be interoperable, such that inputs and outputs identified by one of the trading tools may be identified and/or reacted upon in the other trading tool. The trading tools 422, 424 that make up the combined trading tool 450 may also receive the same market data to be displayed and/or acted upon.

One or more of the trading tools 422, 424 may be resized upon attachment to generate the combined trading tool 450. For example, the trading tool 422 may be resized to fit the side of the trading tool 424 to which the trading tool 422 is attached or the trading tool 424 may be resized to fit the side of the trading tool 422 to which the trading tool 424 is attached. Though the combined trading tool 450 is made up of two trading tools, the combined trading tool may be made up of any number of tools.

The trading tools 422, 424 that make up the combined trading tool 450 may be resized within the space occupied by the combined trading tool 450. For example, the user may select tool configuration tab 452 to configure the trading tool 422 or the tool configuration tab 454 to configure the trading tool 424 within the combined trading tool 450. The tool configuration tab 454 may be selected and moved up or down to enlarge or minimize, respectively, the space within the combined trading tool 450 that is occupied by the trading tool 424. Similarly, the tool configuration tab 452 may be selected and moved up or down to enlarge or minimize, respectively, the space within the combined trading tool 450 that is occupied by the trading tool 422. The outside borders of the combined trading tool 450 may be selected and moved to change the size of the combined trading tool 450, which may change the size of the trading tool 424 and/or the size of the trading tool 422. The border 456 between the trading tools 422, 424 may be moved (e.g., up or down) to change the relative space occupied by the trading tools 422, 424. The computing device may determine, based on the movement of the borders or the tool configuration tab, whether to resize one or more of the trading tools 422, 424 and/or refit (e.g., re-center) the information displayed within the trading tools 422, 424 based on the size occupied by the trading tools 422, 424 within the combined trading tool 450. In certain embodiments, the selections, options and functionality provided by the tool configuration tab 452 and the tool configuration tab 454 may be provided by a right-click accessible pop-up menu. In certain embodiments, the selections, options and functionality provided by the tool configuration tab 452 and the tool configuration tab 454 may be provided by a gesture such as a double-tap or swipe configured to reveal a menu on a tablet or other touch-enabled device.

The tool configuration tabs 452, 454 may be selected to further configure the respective tools 422, 424. For example, the selection of the tool configuration tabs 452, 454 may display a menu of operations for configuring the respective tools 422, 424. The menu of operations for configuring each tool may also, or alternatively, be displayed by another selection (e.g., a right click of the mouse, etc.) of the respective tools 422, 424. The menu of operations may include an operation for minimizing a tool, such that one of the tools 422, 424 may be minimized so as not to be fully displayed or may not be displayed at all. The minimized tool may occupy less space and/or less processing resources when the tool is being unused. The user may select the tool configuration tab 452, 454 corresponding to the minimized tool to expand the tool from the minimized view.

The user interface 400 may include a save button 446. The save button 446 may be selected to store manipulated tools for subsequent access by the user. The user may be prompted to provide a name of the manipulated tool to be stored with the configuration of the tool. The computing device may store the manipulated tool with a unique identifier and/or name to enable a user to later execute the tool having the same configuration. Though the user interface 400 shows a save button 446, the user may otherwise store manipulated tools in the user interface 400. For example, the user may right click the user interface 400 and may be presented with a menu that allows the user to select a menu item to save the manipulated tools in the user interface 400.

The user interface 400 may include an assemble/disassemble button 444. The assemble/disassemble button 444 may be selected to allow a user to assemble or disassemble combined tools in the manipulation mode. The user may select the assemble/disassemble button 444 to switch between assembling combined trading tools and disassembling the combined trading tools. Though the user interface 400 shows an assemble/disassemble button 444, the user may otherwise switch between assembling and disassembling combined tools in the user interface 400. For example, the user may right click the user interface 400 and may be presented with a menu that allows the user to select menu items to switch between modes for assembling and disassembling combined tools in the user interface 400.

Figure 4E:
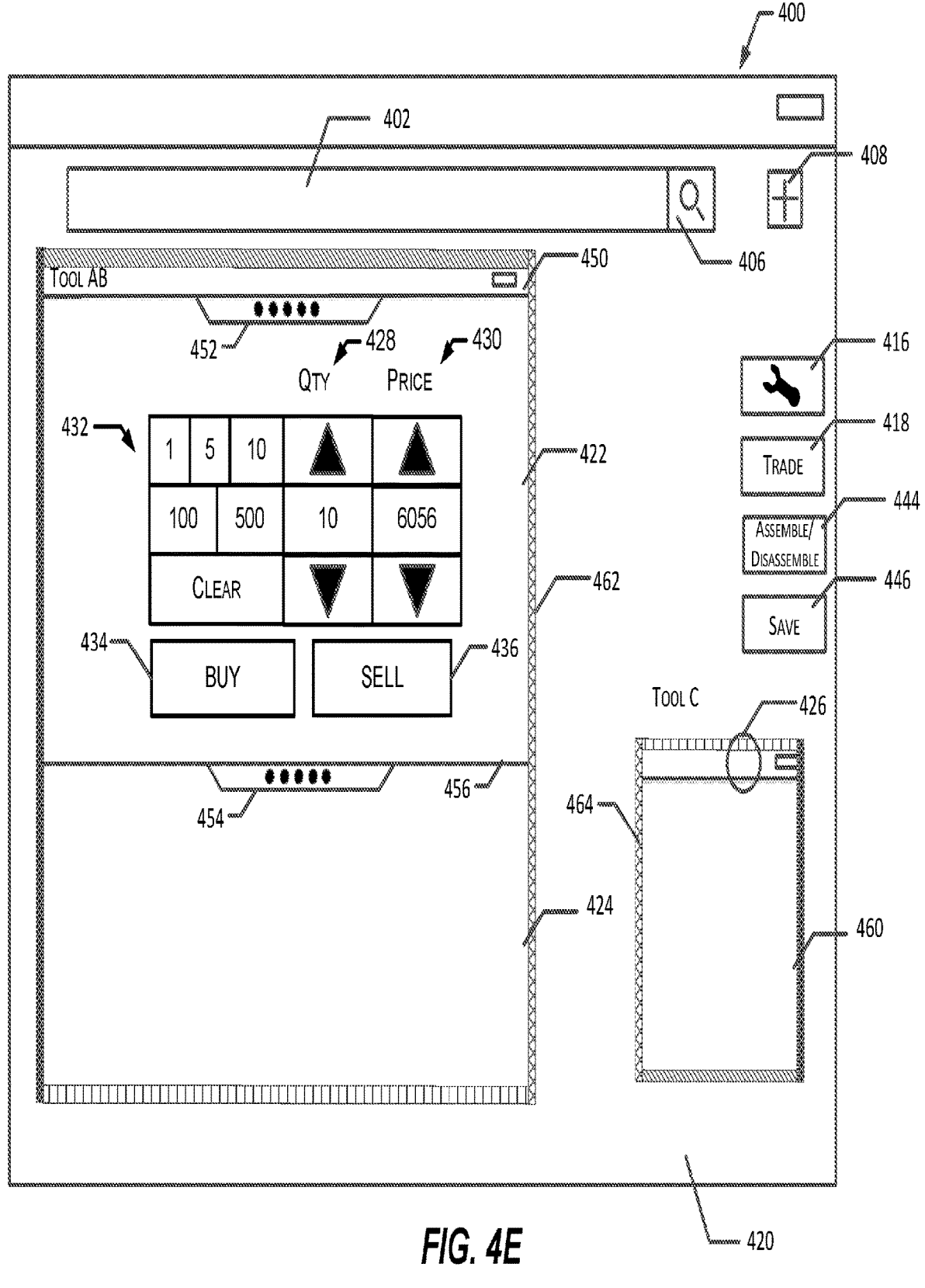

As shown in FIG. 4E, the user may continue to manipulate the combined trading tool 450. For example, the user may execute a trading tool 460 that may be displayed in the user interface 400. The trading tools 450, 460 may be displayed in the workspace 420 during the manipulation mode to allow for manipulation of the trading tools 450, 460. The trading tool 460 may interact with the same market data as the trading tools 422, 424 that make up the combined trading tool 450, such that the interaction with the market data on one trading tool may be identified by the other trading tool.

The user may select the trading tool 460 to be manipulated. The user selection indicator 426 may identify the location of the user selection. A user may manipulate the trading tools 450, 460 to add the trading tool 460 to the combined trading tool 450. The user may combine the trading tool 450 and the trading tool 460 by dragging the trading tool 460 and attaching the trading tool 460 to the trading tool 450. The user may drag the trading tool 460 to a location on the trading tool 450 to which the user would like the trading tool 460 to be attached.

As shown in FIG. 4E, the user interface 400 may identify locations on the combined trading tool 450 and the trading tool 460 that may be attached. The locations on the combined trading tool trading tool 450 and the trading tool 460 that may be attached may be identified by attachment indicator 462 and attachment indicators 464, respectively. For example, the attachment indicators 462 and 464 may identify different sides of the trading tools 450 and 460, respectively, that may be attached to one another. The attachment indicator 462 on the combined trading tool 450 may include different patterns, colors, symbols, and/or other differentiators that correspond to attachment indicators 464 on the trading tool 460.

The attachment indicator 462 on the combined trading tool 450 may be displayed in different locations than the attachment indicators 440, 442 (shown in FIG. 4C) that may be displayed on the trading tools 422, 424 when the trading tools are independently executed and displayed in the user interface 400. For example, the sides of the trading tools 422, 424 that are attached in the combined trading tool 450, or portions thereof, may be unavailable for attachment by the trading tool 460. The combined sides of the trading tools 422, 424 that make up the combined trading tool 450 may be treated as a single side or location to which the trading tool 460 may be attached. Additionally, or alternatively, the independent sides of the trading tools 422, 424 that make up the combined trading tool 450 may be treated as a single side or location to which the trading tool 460 may be attached. The trading tools 450, 460 may be attached at the locations having the corresponding attachment indicators 462, 464. For example, the trading tools 450, 460 may be attached on opposite sides of each tool.

Figure 4F:
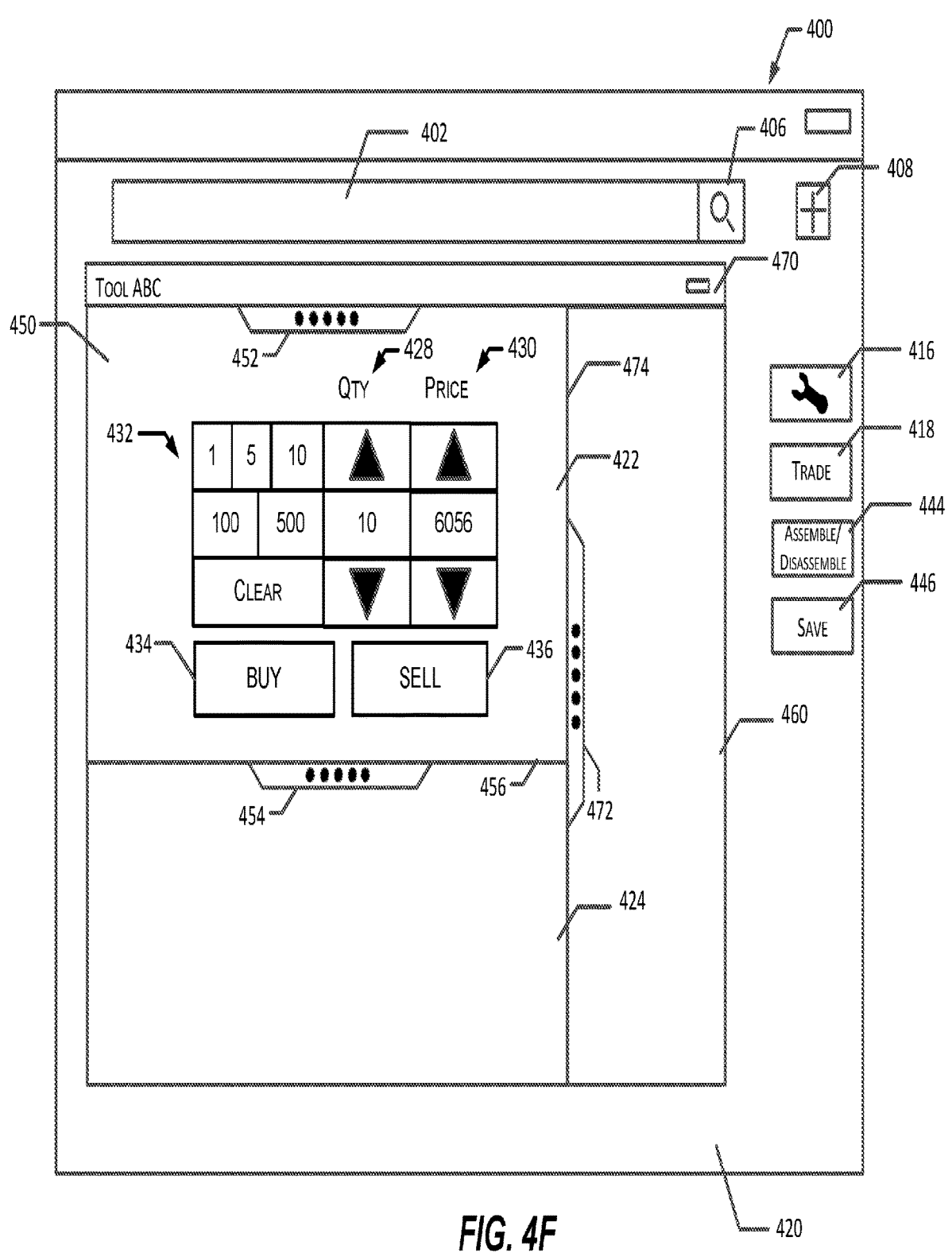

FIG. 4F shows an example of a combined trading tool 470. The combined trading tool 470 may include the combined trading tool 450 and the trading tool 460. The independent trading tools 422, 424, 460 that make up the combined trading tool 470 may be interoperable, such that inputs and outputs identified by one of the trading tools may be identified and/or reacted upon in the other trading tool.

One or more of the trading tools 422, 424, 460 may be resized upon attachment to generate the combined trading tool 470. For example, the trading tool 460 may be resized to fit the sides of the trading tools 422, 424 that make up the combined trading tool 450 to which the trading tool 460 is attached. The trading tool 460 may be resized within the space occupied by the combined trading tool 470. For example, the user may select tool configuration tab 472 to configure the trading tool 460. The tool configuration tab 472 may be selected and moved left or right to enlarge or minimize, respectively, the space within the combined trading tool 470 that is occupied by the trading tool 460. Similarly, the border 474 may be selected and moved left or right to enlarge or minimize, respectively, the space within the combined trading tool 470 that is occupied by the trading tool 460. Changing the size of the trading tool 460 may affect (e.g., minimize or enlarge) the space occupied by the trading tool 422 and the trading tool 424, as the border 474 is shared with the trading tools 422, 424.

The outside borders of the combined trading tool 470 may be selected and moved to change the size of the combined trading tool 470, which may change the size of the trading tools 422, 424, and/or 460. The computing device may determine, based on the movement of the borders or the tool configuration tabs, whether to resize one or more of the trading tools 422, 424, 460 and/or refit (e.g., re-center) the information displayed within the trading tools 422, 424, 460 based on the size occupied by the trading tools.

Figure 4G:
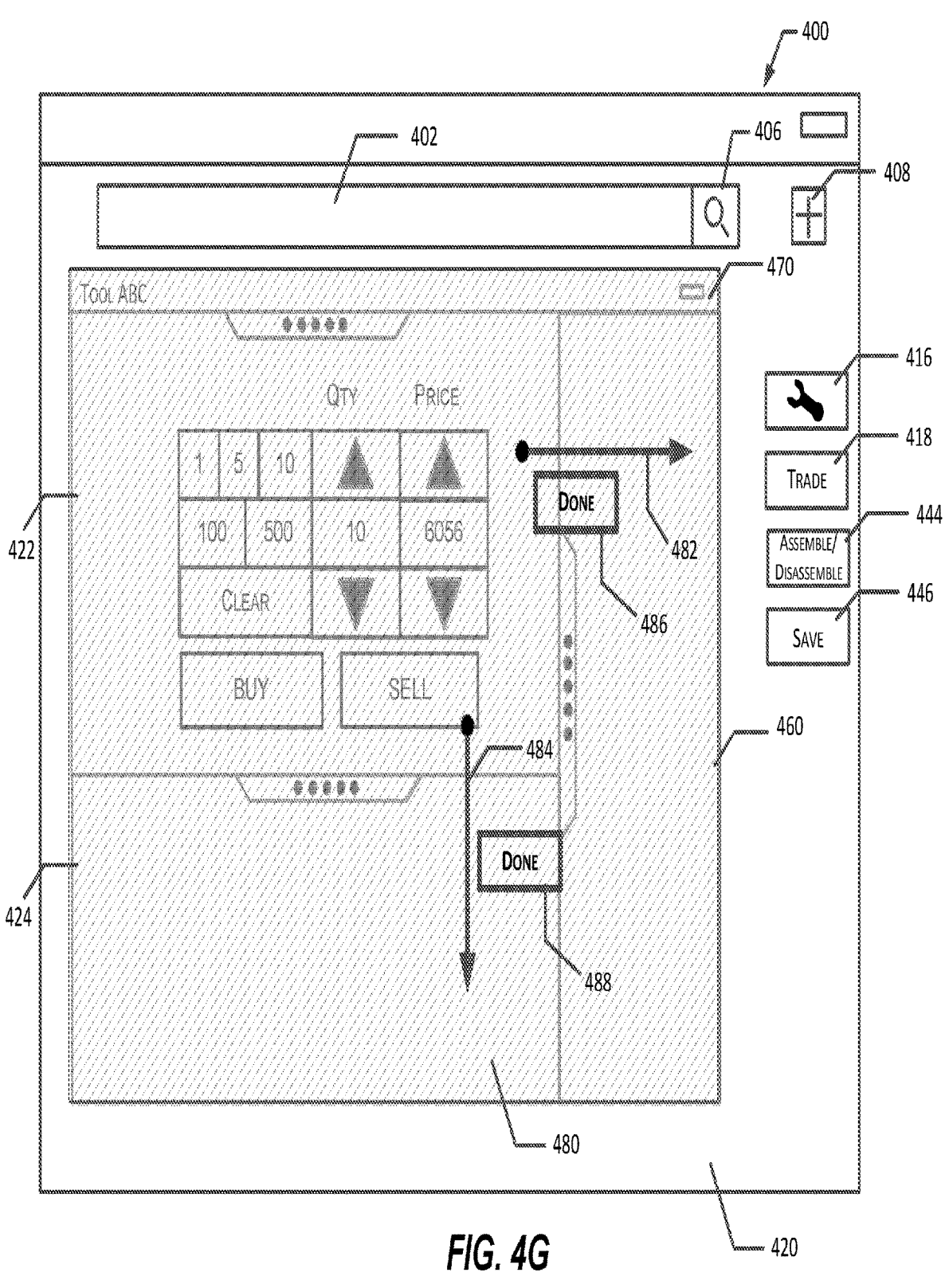

FIG. 4G shows an example display that may be used to disassemble a combined trading tool, such as the trading tool 470, for example. The user interface 400 may include disassembly indicators 482, 484 that may be used to identify one or more tools to be detached from the combined trading tool 470. The disassembly indicators may be displayed upon selection of the assemble/disassemble button 444 to allow the user to manipulate the combined trading tool 470.

The disassembly indicators 482, 484 may be generated between different tools for identifying the tools to be detached from the combined trading tool 470. Each of the disassembly indicators 482, 484 may be overlaid on top of multiple tools for which the disassembly indicators 482, 484 may be used for control. Each end of the disassembly indicators 482, 484 may correspond to different trading tools. The disassembly indicators 482, 484 may include an arrow in the direction of the tools that may be detached from the combined trading tool 470. The disassembly indicators 482, 484 may include a point in the direction of the tools that may remain attached to the other tools in the combined trading tool 470.

As shown in FIG. 4G, the disassembly indicator 482 includes an arrow that points to the trading tool 460. The arrow identifies that the trading tool 460 may be detached from the other tools within the combined trading tool 470. As the trading tool 460 is attached to each of the tools 422, 424, the disassembly indicator 482 may identify that the trading tool 460 is to be detached from both of the tools 422, 424. In another example, the user interface 400 may include a different disassembly indicator for each of the tools 422, 424 to which the trading tool 460 is attached.

The disassembly indicator 482 includes a point at the other end to identify that the trading tool 422 may remain attached to the other tools in the combined trading tool 470. Similarly, the trading tool indicator 484 includes a point at a first end and an arrow at a second end to indicate that the trading tool 424 is to be removed or separated from the trading tool 422. The user may select the disassembly indicators 482, 484 to change the identified tools to be detached from the combined trading tool 470. For example, the user may select the disassembly indicator 482 to display an arrow at the other end to identify the trading tool 422 as being a tool to be detached from the other tools within the combined trading tool 470. The disassembly indicators 482, 484 may be selected a different number of times to identify different tools to be detached from or remaining attached to other tools in a combined trading tool.

The user may select buttons 486, 488 to execute the tool configuration identified by the disassembly indicators 482, 484, respectively. For example, when the user selects the button 486, the trading tool 460 may be detached from the trading tools 422, 424. The trading tool may be removed from the user interface 400 upon detachment or may remain within the user interface 400. The detached trading tool 460 may continue to be interoperable with the trading tools 422, 424, or the interoperability may be removed upon being detached. For example, upon being detached, the trading tool 460 may no longer react to inputs/outputs on the trading tools 422, 424 and/or the market data being received at the trading tools 422, 424. The trading tool 460 may be prevented from receiving the inputs/outputs on the trading tools 422, 424 and/or the market data upon detachment. In another example, in order to allow for faster and more efficient interoperability upon re-attachment, the trading tool 460 may continue to receive the inputs/outputs on the trading tools 422, 424 and/or the market data being received at the trading tools 422, 424, such that the trading tool 460 may more quickly interact with the other trading tools upon attachment.

The disassembly indicators 482,484 may be generated by a computing device and displayed on a window pane 480 that overlays the combined trading tool 470. The window pane 480 may be at least partially transparent, such that the combined trading tool 470 may be identified by the user. The window pane 480 may be fit to the size of the combined trading tool 470, which may be retrieved from memory. The disassembly indicators 482,484 may be displayed on a portion of the window pane 480 that corresponds to the underlying tools. The window pane 480, the disassembly indicators 482,484, and/or the button 486 may be displayed upon selection of the assemble/disassemble button 444 to allow the user to manipulate the combined trading tool 470. The user may store the manipulated trading tool after disassembly of the combined trading tool 470 by selecting the save button 446.

Figure 4H:
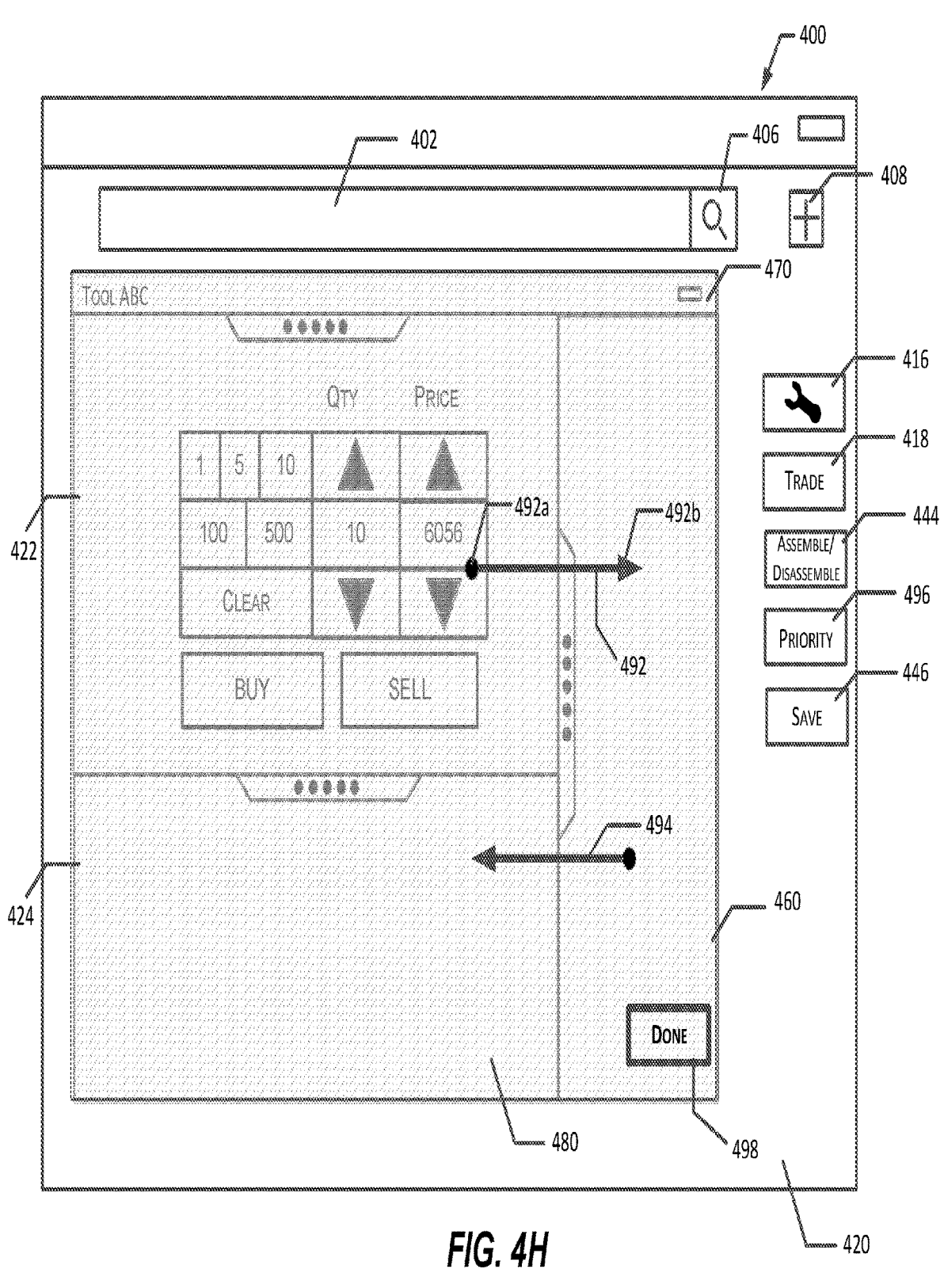

FIG. 4H shows an example display that may utilize a variation of the disassembly indicators 482 and 484 (see FIG. 4G) to depict communication priorities between the trading tools 422, 424 and 460. For example, as indicated in FIG. 4H, the priority indicators 492 and 494 may be displayed once the combined trading tool 470 has been established. In one example, once the trading tools 422, 424 and 460 have been assembled to define the combined trading tool 470, the user may select the priority button 496 in order to specify the communication priority between the tools. In particular, upon selection of the priority button 496, the combined trading tool 470 may be displayed in a priority mode that allows the user to define the priority relationship between the individual trading tools 422, 424 and 460. For example, in priority mode, the user may initially select the trading tool 422 causing a base 492a of the priority indicator 492 to be depicted within the confines of the trading tool 422. Subsequently, the user may select the trading tool 460 causing the priority indicator 492 to be drawn between the trading tool 422 and the trading tool 460. A directional arrow 492b may be depicted within the trading tool 460 to indicate that information and/or control flows from the trading tool 422 to the trading tool 460. Thus, a change in the trading tool 422 will be reflected in the trading tool 460. The process may be repeated between the trading tool 460 and the trading tool 424. In this way, a hierarchy may be established between the trading tools 422, 424 and 460. Upon completion of the priority process, the user may select the button 498 to exit the priority mode. In certain embodiments, the communication may be bi-directional between the trading tools 422, 424 and 460 and the priority mode may be used to establish which trading tool receives information such as market updates in what order.

Figure 5A:
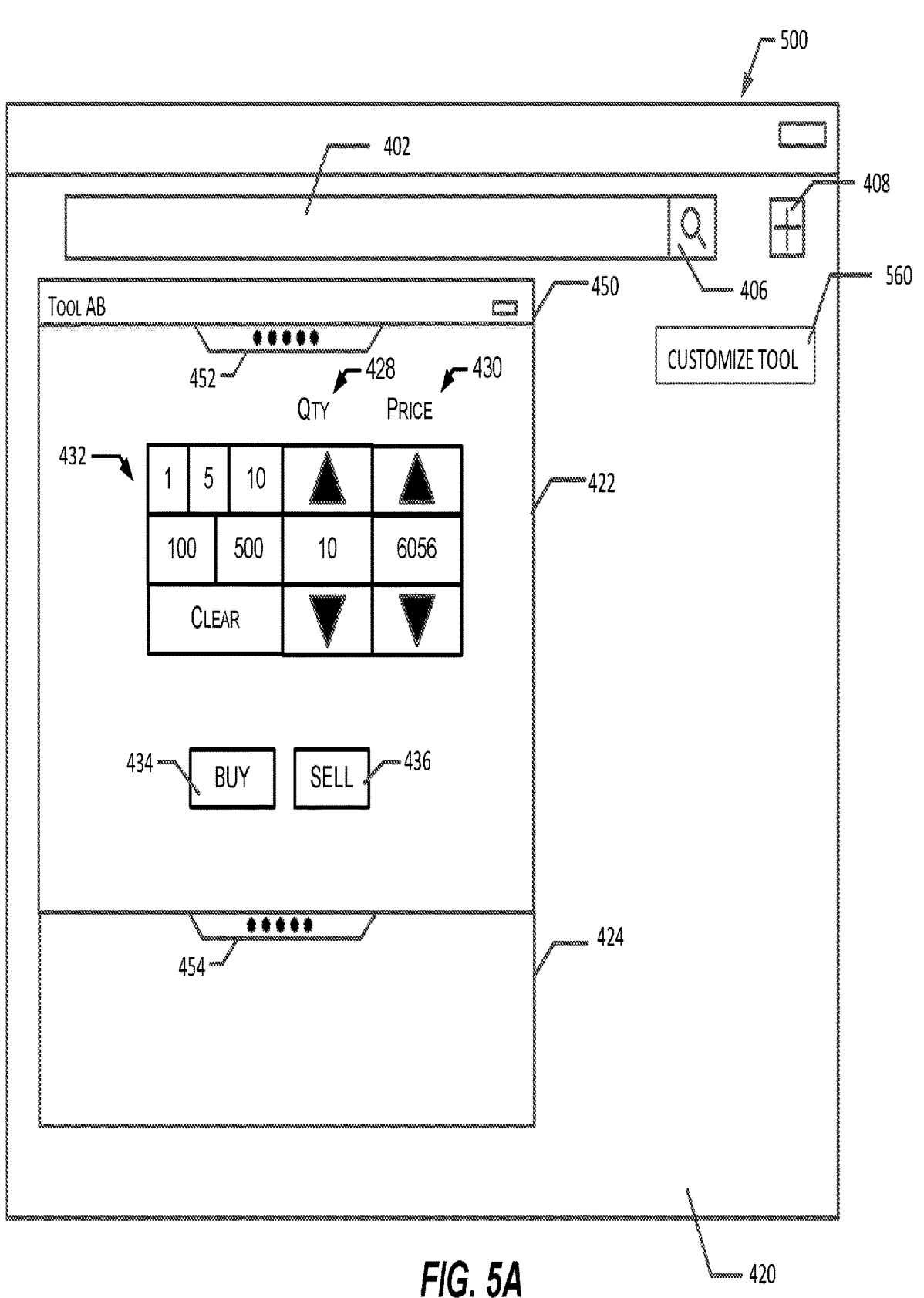
FIGS. 5A-5B illustrate another example user interface that may be displayed on a computing device to allow a user to manipulate trading tools.
Figure 5B:
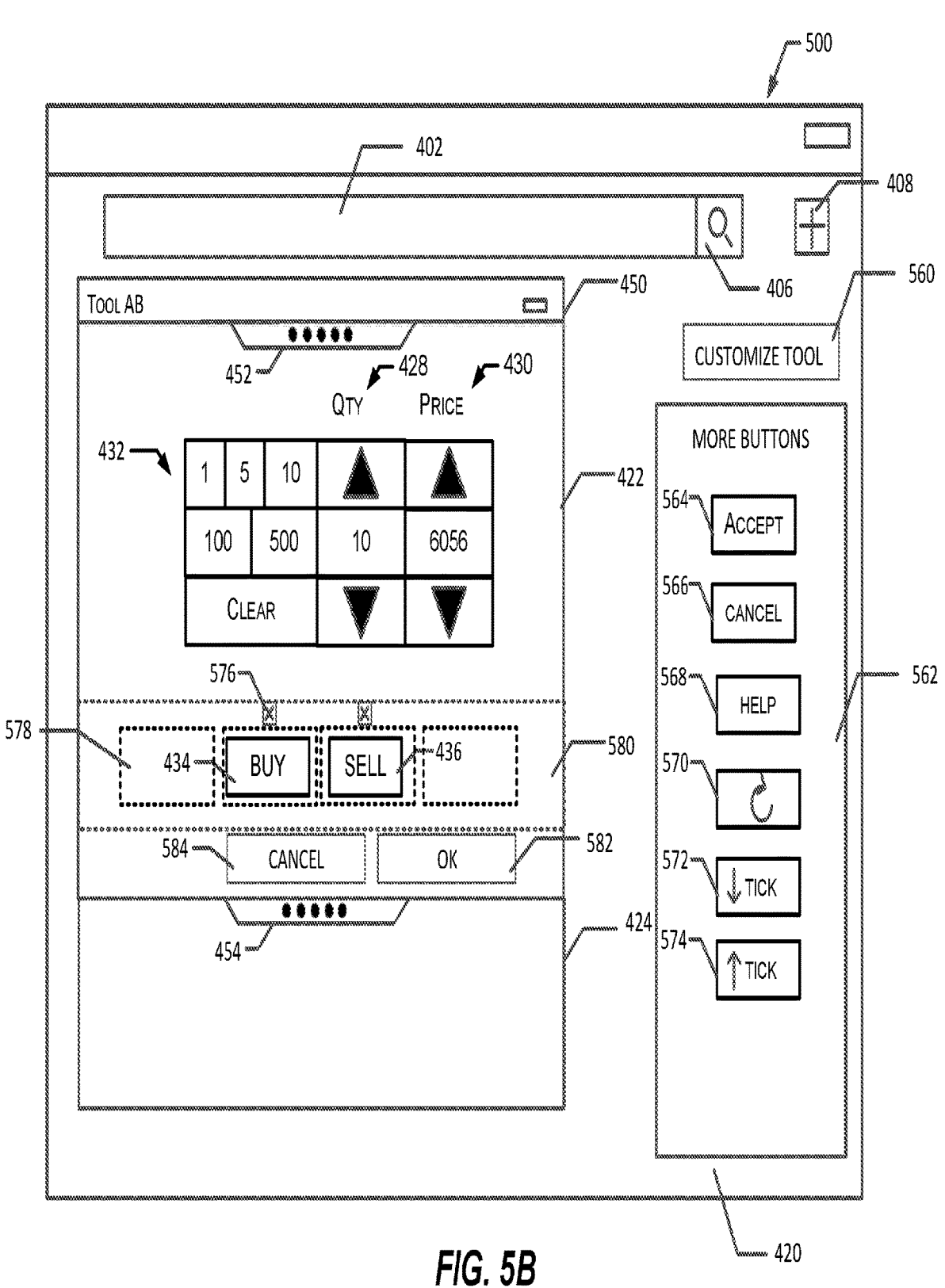

FIGS. 5A-5B illustrate an example user interface 500 that may be displayed on a computing device to allow a user to manipulate trading tools. As different users may wish to use different configurations (e.g., buttons, locations of buttons, etc.) for trading tools or groups of trading tools differently to fit the user's trading style, the user interface 500 may assist the user in manipulating trading tools for providing the user with an interface that fits the user's particular trading style. As shown in FIG. 5A, the user interface 500 may include a customize tool button 560. The customize tool button 560 may be included in the user interface 400, or other user interfaces described herein, but is shown separately for illustration. For example, the customize tool button 560 may be displayed when the computing device enters the trading tool manipulation mode. The user may select the customize tool button 560 to enable the user to rearrange (e.g., add, remove, change location, etc.) predefined areas within the user interface 500.

The user interface 500 shows the combined trading tool 450 (see FIGS. 4D and 4E), which includes tools 422 and 424, though any trading tools may be included. Upon selection of the customize tool button 560, the computing device may determine the types of trading tools in the combined trading tool 450. Different types of trading tools, or combinations of trading tools, may include different predefined areas for customization. For example, different predefined areas may include different buttons for interacting with the trading tools. The predefined areas may be moved to different locations within the trading tools 422, 424 and/or different functionality may be rearranged (e.g., add, remove, change location, etc.) within the predefined areas of the trading tools 422, 424.

As shown in FIG. 5B, the computing device may identify the predefined area 580 for customization of the trading tool 422 in the combined trading tool 450. The predefined area 580 may be rearranged within the trading tool 422. For example, the predefined area 580 may be moved to a different location. Different predefined areas, such as the predefined area 580, may be added to and/or removed from the trading tools 422, 424 that make up the combined trading tool 450.

The predefined area 580 may include predefined button locations 578. Different buttons may be embedded in the predefined button locations 578 to represent different modules or functionality in the trading tool 422. The number and/or size of the predefined button locations 578, as well as the buttons embedded therein, may change based on the size of the trading tool 422 within the combined trading tool 450. For example, the computing device may have stored thereon a threshold size of the trading tool 422 for different numbers and/or sizes of the predefined button locations 578. As the size of the trading tool 422 is increased above or decreased below the thresholds, the predefined button locations 578 may change as well.

The user may configure and store the size of the predefined area 580, the number of button locations 578, the size of the button locations 578, the types of buttons that may be included in the button locations 578, and/or the configuration (e.g., size, color, symbols, patterns, etc.) of the buttons that may be included in the button locations 578. The user may select (e.g., right click) a space within the predefined area 580 to present a menu of items that may include the different configurable portions of the predefined area. The user may select the portions of the predefined area 580 to be configured and may configure each of the selected portions to be stored at the computing device.

The user may select (e.g., via mouse click, drag and drop, etc.) one or more of the buttons in the pane 562 to be added to the available predefined button locations 578. Each of the buttons in the pane 562 may represent a module or function that may be added to the trading tool 422 to allow the user to interact with the module or function within the respective trading tool to which the button is added. Different buttons may be displayed that correspond to the different available modules or functions within different trading tools. The accept button 564 may allow a user to accept the parameters of a trade order (e.g., buy order, sell order, quantity, price, etc.) to be submitted to an exchange. The cancel button 566 may allow a user to cancel the parameters of a trade order. The help button 568 may trigger a help function corresponding to the tool in which the help button 568 is incorporated. The help function may cause help information to be displayed to the user. The help button 568 may be included in different portions of a tool to display different help information. The reset button 570 may allow a user to reset the tool in which the reset button 570 is included. For example, the reset button 570 may re-execute the tool or reset (e.g., refresh) the display of the market data received at the tool. The downtick button 572 and the uptick button 574 may adjust the minimum price of a tradeable object upward or downward, respectively.

The buttons described herein are provided as examples. Other buttons may be displayed that may correspond to available functions within trading tools or combined trading tools. Different buttons may be displayed for different modules or functions that may be available within a combined trading tool. For example, the interoperability between different groups of trading tools may allow for different modules or functions to be enabled. The predefined areas for customization of the trading tools may also change based on the different trading tools within the combined trading tool. Though FIG. 5B shows an example of a combined trading tool 450, which includes trading tools 422 and 424, the customize tool 560 functionality may be implemented in individual trading tools or in different combinations of trading tools.

The user may select the remove button icon 576 for a corresponding button to remove the button from the trading tool 422 within which the button is embedded. The removal of a button may remove the availability of the corresponding functionality of the button. This may provide for a more efficient use of space within the combined trading tool 450. The removed button may be displayed in the pane 562. When the user has finished rearranging the configuration of the buttons in the combined trading tool 450, the user may select the button 582 to accept the configuration or the button 584 to reject or cancel the configuration and return to the previous configuration prior to the rearrangement.

FIGS. 6A-6D illustrate an example user interface 600 that may be displayed on a computing device to allow a user to manipulate trading tools. As different users may wish to open multiple instances of trading tools or groups of trading tools at a time, the user interface 600 may assist the user in manipulating trading tools for providing the user with the instances or groups of the trading tools in an efficient manner.

Figure 6A:
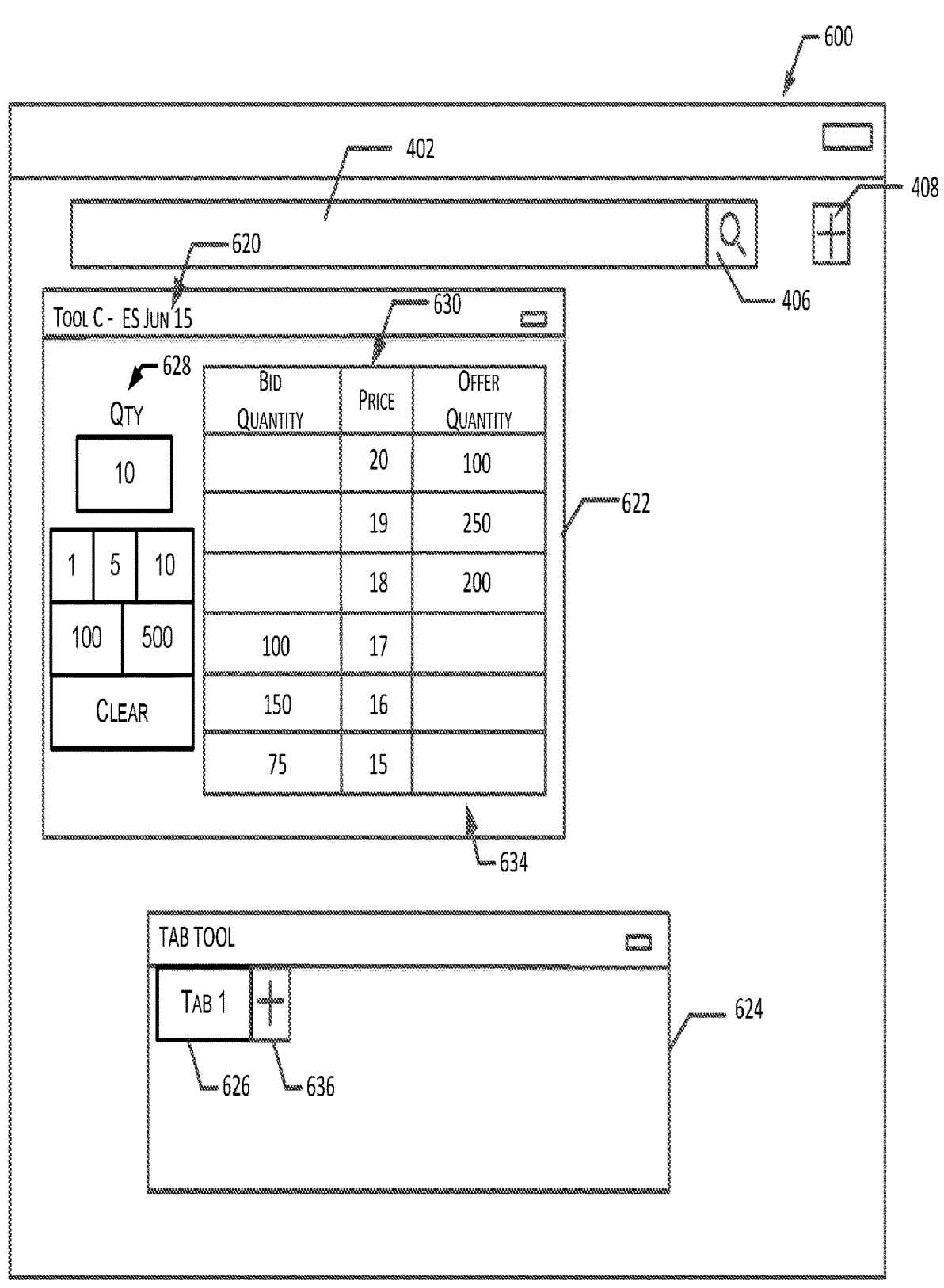
FIGS. 6A-6D illustrate another example user interface that may be displayed on a computing device to allow a user to manipulate trading tools.

As shown in FIG. 6A, the user interface 600 may include a tabs tool 624 that may display tabs that correspond to instances of a tool to allow for selection and display of different instances of the tool. The tabs tool 624 may be generated upon a search in the search field 402 and/or selection from a tools field. The tabs tool 624 may include a tab 626 and/or a tab generator 636. One or more tabs, such as the tab 626, may be displayed as a default upon execution of the tabs tool 624. The tab 626 may also, or alternatively, be generated upon selection of the tabs generator 636.

The user interface 600 may include one or more other tools to which the tabs tool 624 may be attached. For example, FIG. 6A shows a trading tool 622 to which the tabs tool may be attached. The trading tool 622 may be an order window tool that may allow a user to enter one or more order parameters for a trade order. For example, the user may select the order quantity 628 and the order price 630 for the trade order. The trading tool 622 may include a price ladder 634 that may display the bid quantities and offer quantities at available prices within the received market data. The displayed prices and quantities may correspond to the market data for the tradeable object 620. The user may select the tradeable object 620 for populating the trading tool 622 with market data corresponding to the tradeable object 620. The user may select the price 630 in the price ladder to identify the order price 630 for the trade order. Though the trading tool 622 is shown as an order window tool, the tabs tool 624 may be attached to any trading tool or other application to generate instances of the trading tool or application.

Figure 6B:
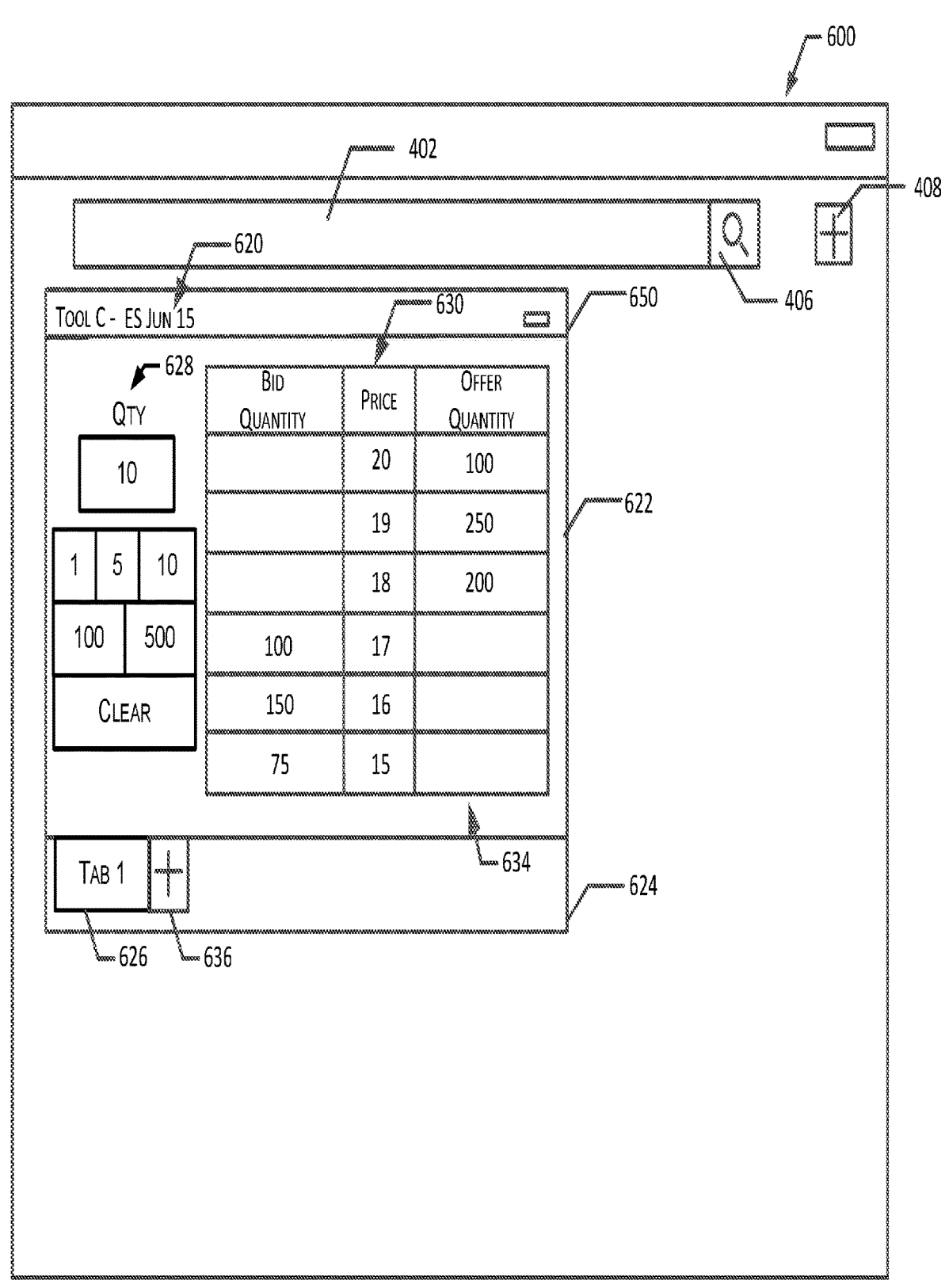

As shown in FIG. 6B, the tabs tool 624 may be attached to the trading tool 622 to create a combined trading tool 650. Upon attachment, the computing device may associate the tab 626 with the instance of the trading tool 622 being displayed. For example, the computing device may store an association (e.g., a database association) between the tab 626 and the instance of the trading tool 622 that is displaying the market data for the tradeable object 620. To add another instance of the trading tool 622 within the combined trading tool 650, the user may select the tab generator 636.

Figure 6C:
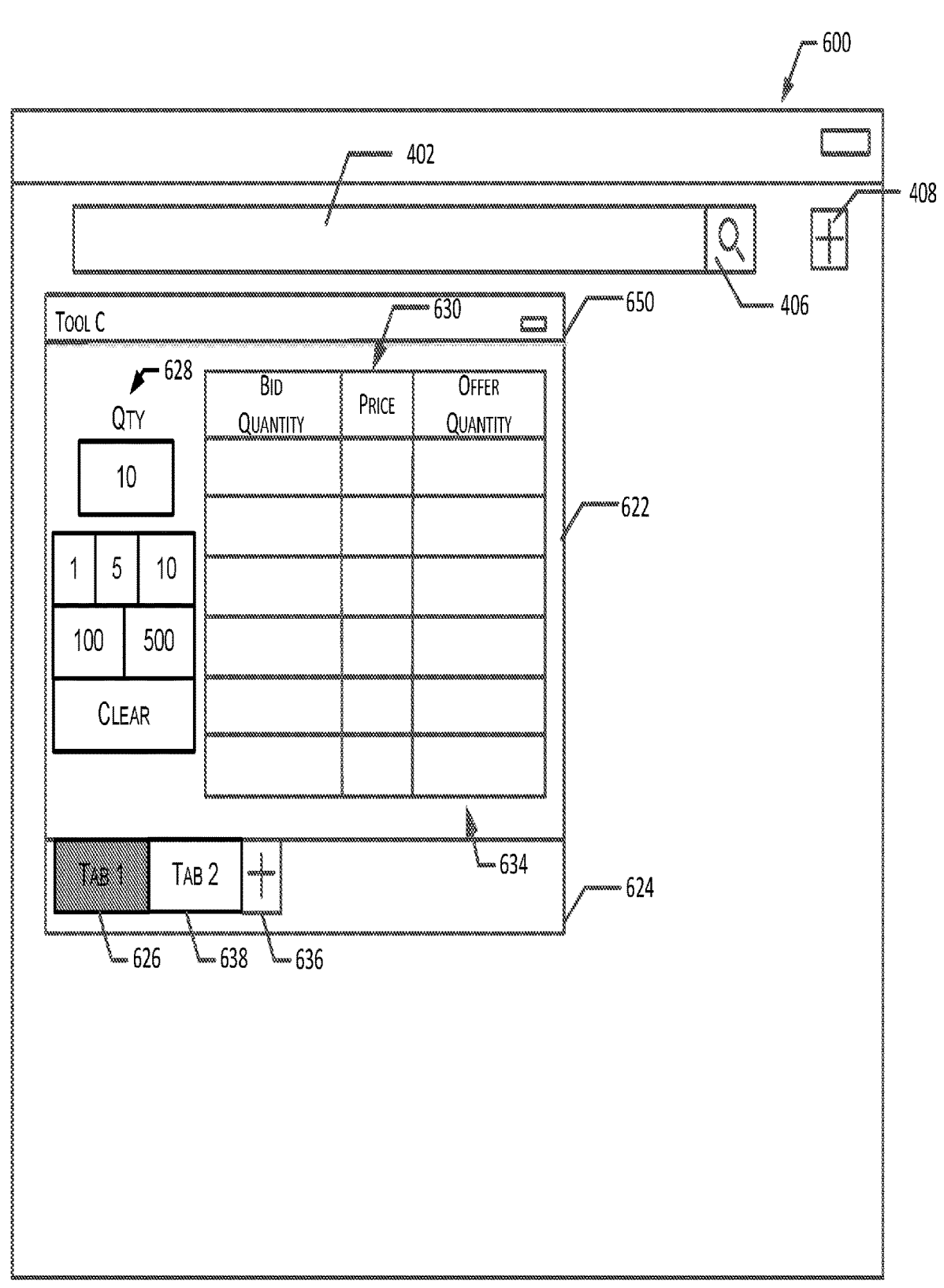

As shown in FIG. 6C, the computing device may generate another tab 638 upon selection of the tab generator 636. The computing device may associate the tab 638 with another instance of the trading tool 622 within the combined trading tool 650. For example, the computing device may store an association (e.g., a database association) between the tab 638 and the instance of the trading tool 622 that is displayed. The tab 638 that is associated with the instance of the trading tool 622 that is being displayed may be differentiated from the tab 626 that is associated with the instance of the trading tool that is being hidden. For example, the tab 638 may have a different shade, color, symbol, and/or other differentiator from the tab 626.

The instance of the trading tool 622 that is associated with the tab 638 may be displayed without associated market data (e.g., as a default). The user may select the market data to be displayed in the instance of the trading tool 622 that is associated with the tab 638. For example, the user may select a tradeable object for which the market data may be displayed in the instance of the trading tool 622 that is associated with the tab 638. The tradeable object may be selected from the search results that may be returned upon execution of a search in the search field 402, for example.

Figure 6D:
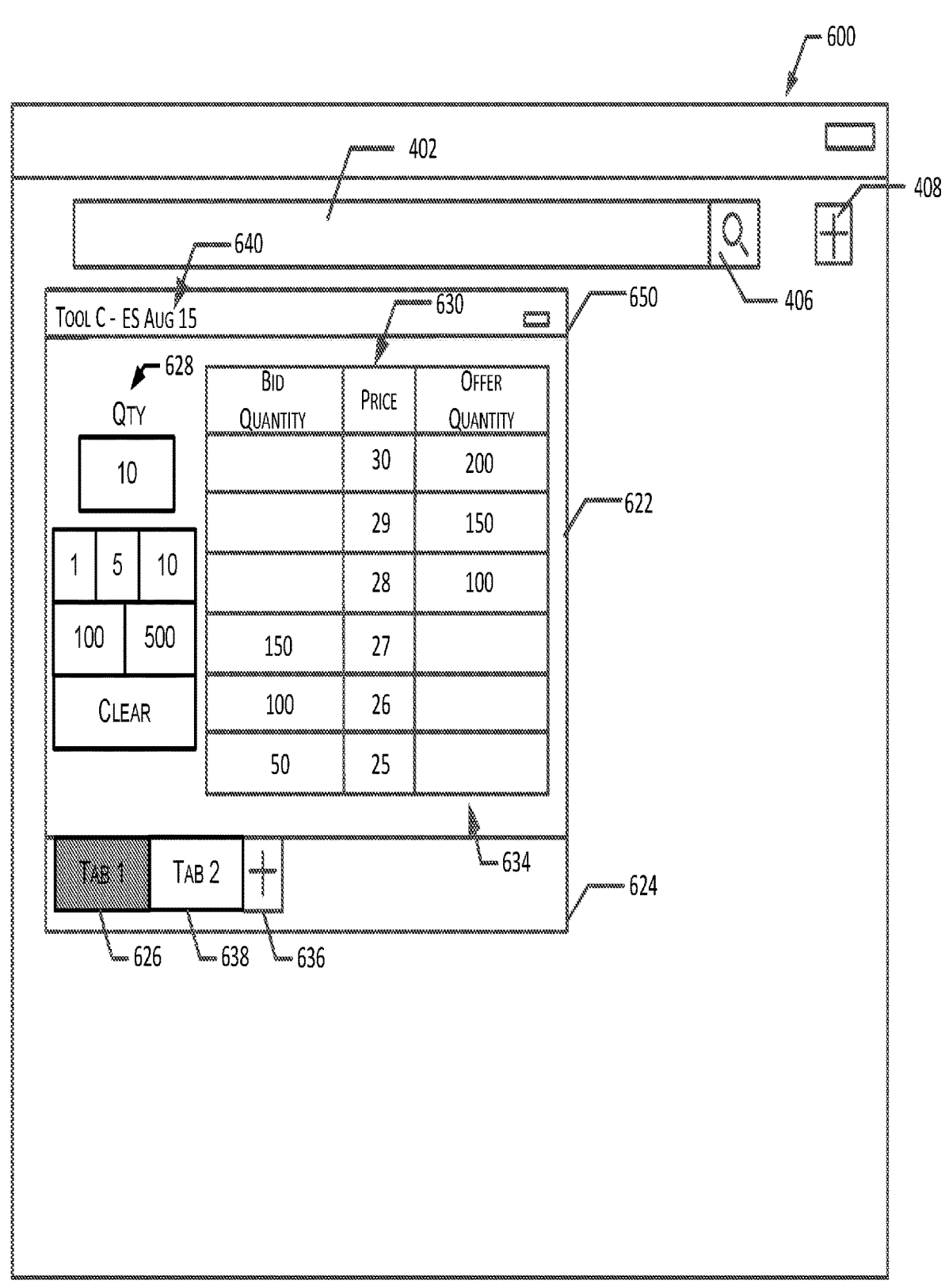

FIG. 6D shows the instance of the trading tool 622 that is associated with the tab 638 being displayed with associated market data. The market data may reflect the market data for the tradeable object 640. The tradeable object 640 may be selected after the instance of the trading tool 622 that is associated with the tab 638 is displayed or before the instance of the trading tool 622 that is associated with the tab 638 is displayed, such that the instance may be displayed with the market data already being uploaded.

The user may display the different instances of the trading tool 622 by selecting the associated tab 626, 638 for each instance. The computing device may retrieve the associated instance upon selection of each tab 626, 638 and display the market data for the tradeable objects 620, 640 in each corresponding instance. To add another instance of the trading tool 622 within the combined trading tool 650, the user may select the tab generator 636. The user may select (e.g., right click) a tab 626, 638 or the instance corresponding with the tab to be provided with an option for deleting the instance. The computing device may allow any number of instances to be generated or limit the instances to a predefined number to preserve processing power on the computing device.

Figure 7:
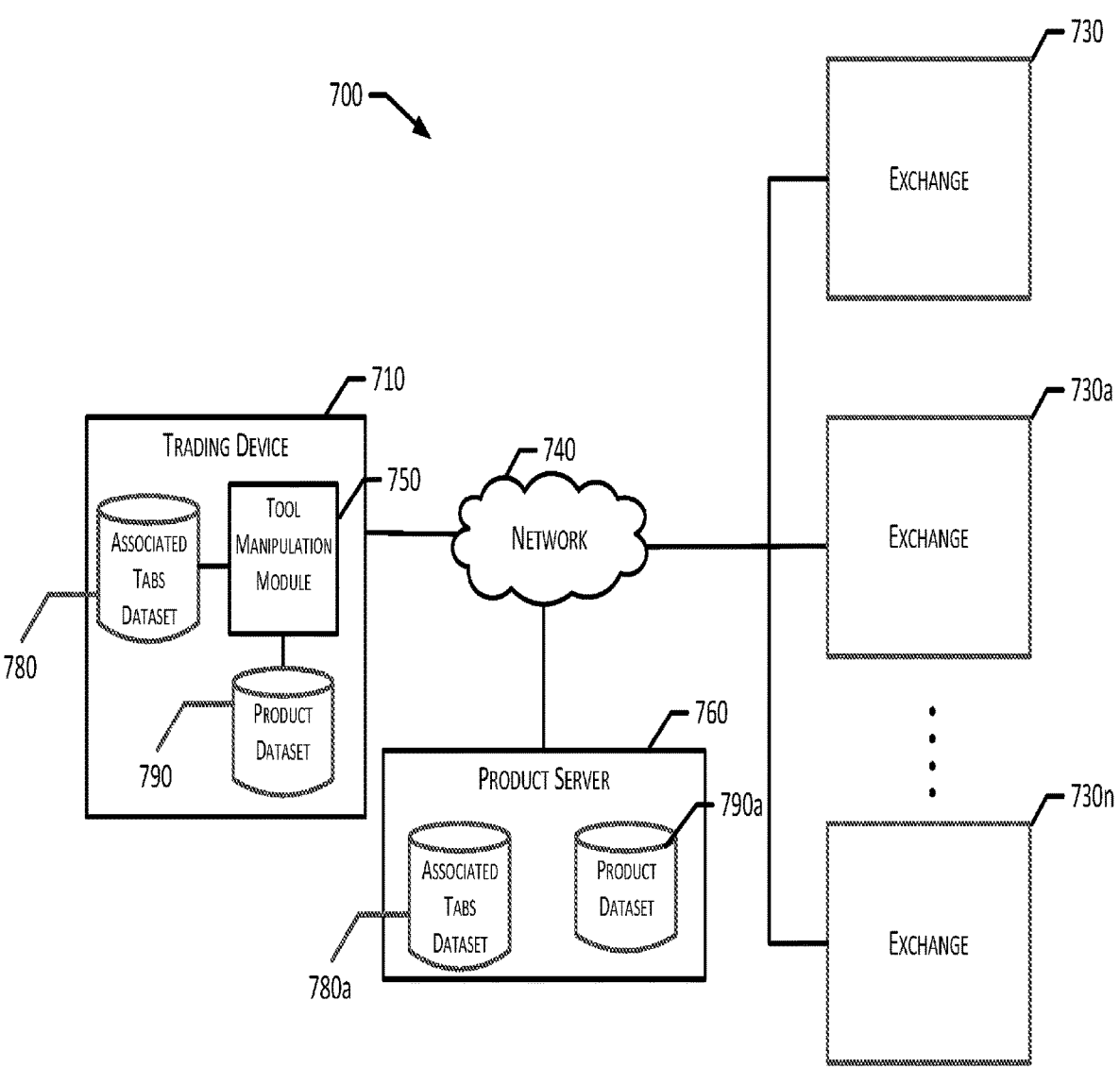
FIG. 7 illustrates a block diagram representative of an example system in which certain embodiments may be employed.

FIG. 7 illustrates a block diagram of an example system 700 that may be used enable a user to manipulate trading tools. The system 700 may include a trading device 710 that may receive market data from one or more exchanges, such as exchange 730 and/or exchanges 730a to 730n. The market data may correspond to one or more tradeable objects at each market. The trading device 710 may communicate with the exchanges directly or through a network 740.

The trading device 710 may be capable of displaying a user interface that may allow a user to manipulate trading tools as described herein. The user interface may also allow the trading tools to display the market data and/or submit trade orders. The trading device 710 may be a trading server and/or a trading terminal. The functionality described herein may be performed on the trading terminal, the trading server, or distributed across the trading terminal and the trading server. For example, the trading device 710 may include a trading terminal capable of displaying a user interface for an application executing locally on the trading terminal or an application executing remotely on the trading server (e.g., via a web browser or other application).

The trading device 710 may include a tool manipulation module 750, which may be executed locally at the trading terminal, at the trading server, or distributed across the trading terminal and the trading server. The tool manipulation module 750 may receive a search input from the trading device 710 and may retrieve information in response to the search input by submitting queries to one or more datasets stored in memory at one or more devices. For example, the search input may be a character string and the tool manipulation module 750 may use the character string to execute the search to retrieve a subset of search results that match the character string at one or more datasets. The search results may include tools or tradeable objects associated with trading tools that may assist a user in identifying trading tools to be executed and/or manipulated. The trading device may display the search results in a user interface to a user.

The tools and/or tradeable objects may be stored in a product dataset 790 to be queried by the tool manipulation module 750. The product dataset 790 may identify the tools that may be executed for displaying data for one or more tradeable objects. The product dataset 790 may be stored in memory locally at the trading device 710 and/or at a remote computing device, such as the product server 760. The product dataset 790a may be a part of the product dataset 790, a duplicate of the product dataset 790, or may be stored independently at the product server 760. The combined trading tools may be stored in the product dataset 790, 790a to be later retrieved by the trading device 710.

The instances of a trading tool and the associated tabs may be stored in associated tabs dataset 780 for accessed by the tool manipulation module 750 upon selection of the associated tab by the user at the trading device. The associated tabs dataset 780 may be stored in memory locally at the trading device 710 and/or at a remote computing device, such as the product server 760. The tabs dataset 780a may be a part of the associated tabs dataset 780, a duplicate of the associated tabs dataset 780, or may be stored independently at the product server 760.

The tool manipulation module 750 may be executed as software and/or hardware. For example, the tool manipulation module 750 may be a software module included in a trading application that is executed by a processor from memory at the trading device 710, or an independent hardware module. The tool manipulation module 750 may generate user interfaces for manipulating tools, displaying market data to a user, and receiving user inputs at the trading device 710. The manipulation of the trading tools at the tool manipulation module 750 may provide for more efficient processing and display of information at the trading device.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A method including:

displaying, by a computing device including a processor, a memory, and a trading application implemented by the processor executing instructions stored in the memory, a workspace of the trading application in a graphical user interface, the workspace including a first trading tool of the trading application and a second trading tool of the trading application;

receiving, by the trading application, a first user selection entering the trading application into a trading tool manipulation mode;

in response to the first user selection entering the trading application into the trading tool manipulation mode, displaying, by the trading application, (i) a first attachment indicator on the first trading tool identifying a side of the first trading tool that may be attached to the second trading tool and (ii) a second attachment indicator on the second trading tool identifying a side of the second trading tool that may be attached to the first trading tool;

receiving, by the trading application, a second user selection with respect to the first attachment indicator and the second attachment indicator;

in response to the second user selection, assembling, by the trading application, a first instance of a combined trading tool from the first trading tool and the second trading tool;

receiving, by the trading application, a third user selection entering the trading application into a priority mode;

in response to the third user selection, establishing, by the trading application, a first communication priority between the first trading tool and the second trading tool specifying the order in which data is distributed between the first trading tool and the second trading tool;

receiving, by the trading application, a fourth user selection;

in response to the fourth user selection, generating by the trading application, a tab tool including a first tab including the first instance of the combined trading tool, and a tab generator;

receiving, by the trading application, a selection of the tab generator; and generating, by the trading application, in response to receiving the selection of the tab generator, a second tab including a second instance of the combined trading tool specifying a second communication priority defined between a second instance of the first trading tool, and a second instance of the second trading tool.

2. The method of claim 1, wherein the first trading tool is one of a market grid tool, a time and sales tool, a trader tool, an order window tool, and a chart tool.

3. The method of claim 1, wherein the second trading tool is one of a market grid tool, a time and sales tool, a trader tool, an order window tool, and a chart tool.

4. The method of claim 1, wherein the first attachment indicator or the second attachment indicator includes at least one of a pattern, a color, and a symbol.

5. The method of claim 1, wherein displaying the workspace within the trading application includes:

receiving by the trading application a first command; and displaying the first trading tool in a workspace of the trading application, wherein the first trading tool is generated in response to the first command.

6. The method of claim 5, wherein displaying the workspace within the trading application includes:

receiving by the trading application a second command; and displaying the second trading tool in the workspace of the trading application, wherein the second trading tool is generated in response to the second command.

7. The method of claim 1, wherein the first attachment indicator identifies a first side of the first trading tool and the second attachment indicator identifies a first side of the second trading tool.

8. The method of claim 1, wherein the second trading tool is resized to a second size when attached to the first trading tool.

9. The method of claim 1, further including:

providing a priority indicator between the first trading tool and the second trading tool.

10. The method of claim 9, wherein the priority indicator is a directional arrow extending between the first trading tool and the second trading tool.

11. The method of claim 10, wherein a reversal of the directional arrow alters the first communication priority between the first trading tool and the second trading tool.

12. The method of claim 10, wherein the directional arrow reflects an information flow between the first trading tool and the second trading tool.

13. A non-transitory computer readable medium having stored therein instructions that when executed by a processor perform a set of operations including:

displaying, by a computing device including the processor, a memory, and a trading application implemented by the processor executing instructions stored in the memory, a workspace of the trading application in a graphical user interface, the workspace including a first trading tool of the trading application and a second trading tool of the trading application;

receiving, by the trading application, a first user selection entering the trading application into a trading tool manipulation mode;

in response to the first user selection entering the trading application into the trading tool manipulation mode, displaying, by the trading application, (i) a first attachment indicator on the first trading tool identifying a side of the first trading tool that may be attached to the second trading tool and (ii) a second attachment indicator on the second trading tool identifying a side of the second trading tool that may be attached to the first trading tool;

receiving, by the trading application, a second user selection with respect to the first attachment indicator and the second attachment indicator;

in response to the second user selection, assembling, by the trading application, a first instance of a combined trading tool from the first trading tool and the second trading tool;

receiving, by the trading application, a third user selection entering the trading application into a priority mode;

in response to the third user selection, establishing, by the trading application, a first communication priority between the first trading tool and the second trading tool specifying the order in which data is distributed between the first trading tool and the second trading tool;

receiving, by the trading application, a fourth user selection;

in response to the fourth user selection, generating by the trading application, a tab tool including a first tab including the first instance of the combined trading tool, and a tab generator;

receiving, by the trading application, a selection of the tab generator; and generating, by the trading application, in response to receiving the selection of the tab generator, a second tab including a second instance of the combined trading tool specifying a second communication priority defined between a second instance of the first trading tool, and a second instance of the second trading tool.

14. The non-transitory computer readable medium of claim 13, wherein the first attachment indicator or the second attachment indicator includes at least one of a pattern, a color, and a symbol.

15. The non-transitory computer readable medium of claim 13, wherein the second trading tool is resized to a second size when attached to the first trading tool.

16. The non-transitory computer readable medium of claim 13, wherein the set of operations further includes:

providing a priority indicator between the first trading tool and the second trading tool.

17. A system including:

a computing device including a processor, a memory, and a trading application implemented by instructions stored in the memory, wherein the computing device is configured to execute the instructions to perform a set of operations including:

displaying, by the trading application, a workspace of the trading application in a graphical user interface, the workspace including a first trading tool of the trading application and a second trading tool of the trading application;

receiving, by the trading application, a first user selection entering the trading application into a trading tool manipulation mode;

in response to the first user selection entering the trading application into the trading tool manipulation mode, displaying, by the trading application, (i) a first attachment indicator on the first trading tool identifying a side of the first trading tool that may be attached to the second trading tool and (ii) a second attachment indicator on the second trading tool identifying a side of the second trading tool that may be attached to the first trading tool;

receiving, by the trading application, a second user selection with respect to the first attachment indicator and the second attachment indicator;

in response to the second user selection, assembling, by the trading application, a first instance of a combined trading tool from the first trading tool and the second trading tool;

receiving, by the trading application, a third user selection entering the trading application into a priority mode;

in response to the third user selection, establishing, by the trading application, a first communication priority between the first trading tool and the second trading tool specifying the order in which data is distributed between the first trading tool and the second trading tool;

receiving, by the trading application, a fourth user selection;

in response to the fourth user selection, generating by the trading application, a tab tool including a first tab including the first instance of the combined trading tool, and a tab generator;

receiving, by the trading application, a selection of the tab generator; and generating, by the trading application, in response to receiving the selection of the tab generator, a second tab including a second instance of the combined trading tool specifying a second communication priority defined between a second instance of the first trading tool, and a second instance of the second trading tool.

18. The system of claim 17, wherein the first attachment indicator or the second attachment indicator includes at least one of a pattern, a color, and a symbol.

19. The system of claim 17, wherein the second trading tool is resized to a second size when attached to the first trading tool.

20. The system of claim 17, wherein the set of operations further includes:

providing a priority indicator between the first trading tool and the second trading tool.

<div align="center">* * * * *</div>